United States Patent
Sako et al.

(10) Patent No.: US 7,031,246 B2
(45) Date of Patent: Apr. 18, 2006

(54) OPTICAL DISC, OPTICAL DISC REPRODUCING METHOD AND APPARATUS, AND RECORDING METHOD

(75) Inventors: Yoichiro Sako, Tokyo (JP); Shunsuke Furukawa, Tokyo (JP)

(73) Assignee: Sony Corporation, Tokyo (JP)

( * ) Notice: Subject to any disclaimer, the term of this patent is extended or adjusted under 35 U.S.C. 154(b) by 296 days.

(21) Appl. No.: 10/239,183

(22) PCT Filed: Jan. 31, 2002

(86) PCT No.: PCT/JP02/00798

§ 371 (c)(1),
(2), (4) Date: Jan. 2, 2003

(87) PCT Pub. No.: WO02/061741

PCT Pub. Date: Aug. 8, 2002

(65) Prior Publication Data

US 2003/0147323 A1    Aug. 7, 2003

(30) Foreign Application Priority Data

Jan. 31, 2001    (JP)    ............................... 2001-024689

(51) Int. Cl.
*G11B 7/007* (2006.01)
(52) U.S. Cl. ............................. 369/59.25; 369/53.37; 369/53.22; 369/44.26; 369/111
(58) Field of Classification Search ............ 369/59.25, 369/275.3, 275.4, 53.2, 53.22, 111, 53.37, 369/44.26
See application file for complete search history.

(56) References Cited

U.S. PATENT DOCUMENTS

| 5,166,921 A | * | 11/1992 | Matsui | 369/275.3 |
| 5,592,463 A | * | 1/1997 | Muramatsu et al. | 369/47.53 |
| 5,663,946 A | * | 9/1997 | Ohtomo | 369/44.25 |
| 5,732,088 A | * | 3/1998 | Sako | 714/701 |
| 6,072,759 A | * | 6/2000 | Maeda et al. | 369/59.25 |

(Continued)

FOREIGN PATENT DOCUMENTS

EP    602581    6/1994

(Continued)

OTHER PUBLICATIONS

Electronic translation of JP 11-213562.*

(Continued)

*Primary Examiner*—Brian E. Miller
*Assistant Examiner*—Michael V. Battaglia
(74) *Attorney, Agent, or Firm*—Oblon, Spivak, McClelland, Maier & Neustadt, P.C.

(57) ABSTRACT

An optical disc playback method is provided which includes steps of reading identification data recorded in an optical disc loaded in an optical disc player and starting reading data from a second recording area of the optical disc loaded in the optical disc player when it is determined that the loaded optical disc is a one having at least a first recording area and second recording area, a first lead-in area provided along the inner circumference of the first recording area, a second lead-out area provided along the outer circumference of the first recording area, a second lead-in area provided between the outer circumference of the first lead-out area and second recording area, and a second lead-out area provided along the outer circumference of the second recording area.

18 Claims, 10 Drawing Sheets

U.S. PATENT DOCUMENTS

| | | | |
|---|---|---|---|
| 6,154,427 A * | 11/2000 | Yokota et al. | 369/59.21 |
| 6,339,571 B1 * | 1/2002 | Torazawa et al. | 369/53.2 |
| 6,424,615 B1 * | 7/2002 | Ishimura et al. | 369/275.3 |
| 6,515,951 B1 * | 2/2003 | Oh | 369/53.37 |
| 6,541,186 B1 * | 4/2003 | Sato et al. | 430/321 |
| 6,580,684 B1 * | 6/2003 | Miyake et al. | 369/275.3 |
| 6,671,249 B1 * | 12/2003 | Horie | 369/275.3 |
| 2002/0172117 A1 * | 11/2002 | Sako et al. | 369/53.29 |

FOREIGN PATENT DOCUMENTS

| | | |
|---|---|---|
| JP | 4-252470 | 9/1992 |
| JP | 7-98878 | 4/1995 |
| JP | 7-226012 | 8/1995 |
| JP | 11-213562 | 8/1999 |

OTHER PUBLICATIONS

Electronic translation of JP 07-226012.*

Electronic translation of JP 07-98878.*

* cited by examiner

| SYNC (2) | CNT (4) | ADR (4) | TNO (8) | POINT (8) | TIME | | | ZERO (8) | PTIME | | | CRC (16) |
|---|---|---|---|---|---|---|---|---|---|---|---|---|
| | | | | | MIN (8) | SEC (8) | FRAME (8) | | PMIN (8) | PSEC (8) | PFRAME (8) | |

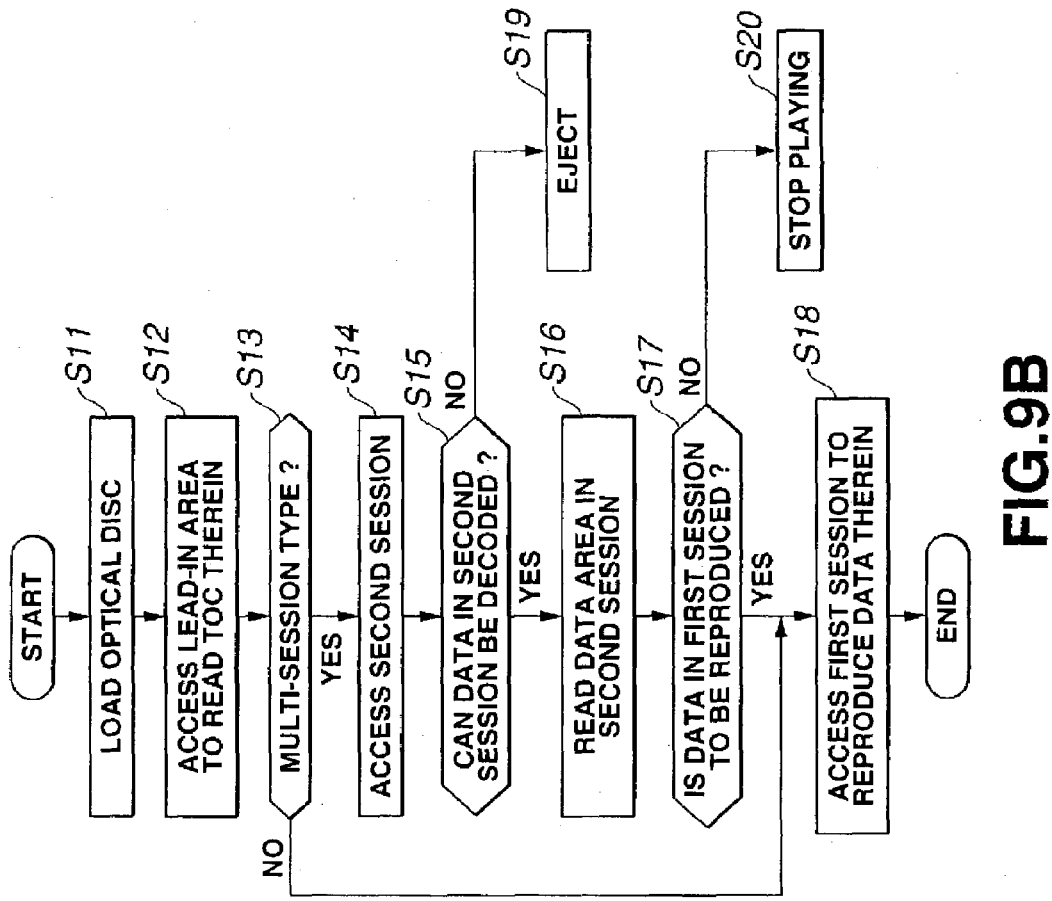
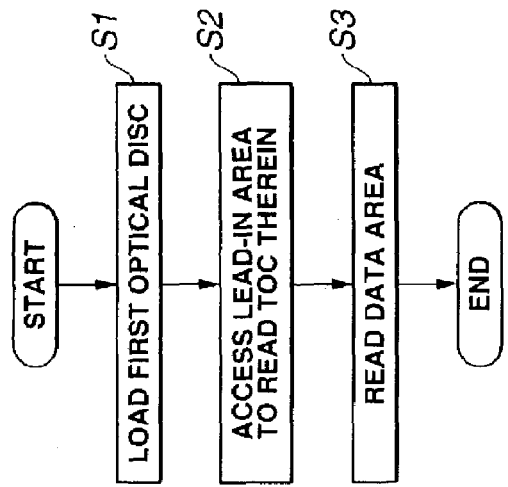

OPTICAL DISC, OPTICAL DISC REPRODUCING METHOD AND APPARATUS, AND RECORDING METHOD

TECHNICAL FIELD

The present invention generally relates to an optical disc, optical disc playback method and apparatus, and an optical disc recording method, and more particularly to an optical disc such as a multi-session type one having a first session in which data is recorded in a first format and a second session in which data is recorded in a second format, an optical disc playback method and apparatus for reading such data recorded in the optical disc, and an optical disc recording method of recording such data in such a manner to an optical disc.

BACKGROUND ART

The conventional compact discs each being an optical disc include a CD-DA disc (Compact Disc-Digital Audio) having music data pre-recorded therein, CD-ROM disc (Compact Disc-Read-Only Memory) having pre-recorded therein text data, program data concerning computer software or the like, CD-R disc (Compact Disc-Recordable) to which data can additionally be recorded, CD-RW disc (Compact Disc-Rewritable) in which data can be rewritten, and a CD-Extra disc (Compact Disc-Extra) having at least two types of data recorded in different recording areas thereof, respectively.

The disc drives for these types of compact discs include a first type being an audio device and dedicated for playback of the CD-DA disc, a second type installed in a personal computer (will be referred to simply as "PC" hereunder) and compatible with all the compact discs of the above-mentioned types, and a third type installed in a PC and capable of playing back all the compact discs of the above types and also of recording data to the CD-R or CD-RW disc. The disc drive of the third type can digitally copy data recorded in the CD-DA, CD-ROM or CD-Extra disc to the CD-R or CD-RW disc, that is, it can record data read from any of the CD-DA, CD-ROM or CD-Extra discs as it is in the digital form to the CD-R or CD-RW disc.

Note here that for digital copying of audio data recorded in the CD-DA disc to a magneto-optical disc, for example, the copyright for the data recorded in the CD-DA disc is managed by the illegal copy preventive system such as SCMS (Serial Copy Management System) or the like which allows only one copy of the data read from the CD-DA disc to the magneto-optical disc.

However, the disc drive of the above third type normally installed in a PC does not adopt the aforementioned illegal copy preventing system such as SCMS or the like. Namely, the disc drive of this type can make digital copy of data with no restrictions being put on the number of times such digital copy can be done. Therefore, the third-type disc drive can make further digital copy of audio data, having been read from the CD-DA disc and digitally copied to a CD-R or CD-RW disc, to another CD-R or CD-RW disc. The user can use the first-, second- or third-type disc drive to play back the CD-R or CD-RW disc having the audio data digitally copied thereto. Thus, the copyrighter such as a recording company, artist or the like will have their copyright breached by such illegal digital copying.

DISCLOSURE OF THE INVENTION

Accordingly, the present invention has an object to overcome the above-mentioned drawbacks of the prior art by providing an optical disc which cannot be played back by existing disc drives such as the first-, second-, third-type disc drive and the like, a method of recording information signals to the optical disc, and an optical disc playback apparatus and method for use with the optical disc.

The above object can be attained by providing an optical disc having, according to the present invention, at least a first recording area and second recording area and in which a first lead-in area is provided along the inner circumference of the first recording area, a first lead-out area is provided along the outer circumference of the first recording area, a second lead-in area is provided between the outer circumference of the first lead-out area and the second recording area, and a second lead-out area is provided along the outer circumference of the second recording area. In the above optical disc, the second lead-in area, second recording area and second lead-out area are formed at a smaller track pitch than in the first lead-in area, first recording area and first lead-out area, and the first lead-in area has recorded therein identification data for the existence of at least the second recording area.

Also the above object can be attained by providing an optical disc playback method including, according to the present invention, steps of reading identification data recorded in an optical disc loaded in an optical disc player, and starting reading data from a second recording area of the optical disc loaded in the optical disc player when it is determined based on the read identification data that the loaded optical disc is a one having at least first and second recording areas, a first lead-in area provided along the inner circumference of the first recording area, a first lead-out area provided along the outer circumference of the first recording area, a second lead-in area provided between the outer circumference of the first lead-out area and the second recording area, and a second lead-out area provided along the outer circumference of the second recording area.

Also the above object can be attained by providing an optical disc playback method including, according to the present invention, steps of reading medium identification data for an optical disc type from a lead-in area of an optical disc loaded in an optical disc player, and reading data from a second recording area when it is determined based on the read medium identification data that the optical disc loaded in the optical disc player is a one in which a second lead-in area, second recording area provided along the outer circumference of the second lead-in area and a second lead-out area provided along the outer circumference of the second recording area are formed at a smaller track pitch than in a first lead-out area provided along the inner circumference of the second lead-in area, first recording area provided along the inner circumference of the first lead-out area and a first lead-in area provided along the outer circumference of the first recording area.

Also the above object can be attained by providing an optical disc playback method including, according to the present invention, steps of reading medium identification data for an optical disc type from a lead-in area of an optical disc loaded in an optical disc player, and reading data from a first recording area when it is determined based on the read medium identification data that the optical disc loaded in the optical disc player is a one in which a second lead-in area, second recording area provided along the outer circumference of the second lead-in area and a second lead-out area provided along the outer circumference of the second recording area are formed at a smaller track pitch than in a first lead-out area provided along the inner circumference of the second lead-in area, first recording area provided along the inner circumference of the first lead-out area and a first lead-in area provided along the outer circumference of the first recording area.

Also the above object can be attained by providing an optical disc player including, according to the present invention, a drive unit to rotate an optical disc loaded in the optical disc player, an optical pickup to read data from the loaded optical disc, an actuator to move the optical pickup radially of the loaded optical disc, and a controller to control the operation of at least the actuator while identifying the type of the loaded optical disc based on identification data read by the optical pickup from the loaded optical disc. The controller controls the actuator to move the optical pickup and cause the optical to start reading data from a second recording area of the loaded optical disc when it is determined that the loaded optical disc is a one having at least first and second recording areas, a first lead-in area provided along the inner circumference of the first recording area, a first lead-out area provided along the outer circumference of the first recording area, a second lead-in area provided between the outer circumference of the first lead-out area and second recording area, and a second lead-out area provided along the outer circumference of the second recording area.

Also the above object can be attained by providing an optical disc player including, according to the present invention, a drive unit to rotate an optical disc loaded in the optical disc player, an optical pickup to read data from the loaded optical disc, an actuator to move the optical pickup radially of the loaded optical disc, and a controller to control the operation of at least the actuator while identifying the type of the loaded optical disc based on identification data read by the optical pickup from the loaded optical disc. The controller controls the actuator to move the optical pickup and causes the optical pickup to start reading data from the second recording area of the loaded optical disc when it is determined based on the medium identification data that the loaded optical disc is a one in which a second lead-in area, second recording area provided along the outer circumference of the second lead-in area and a second lead-out area provided along the outer circumference of the second recording area are formed at a smaller track pitch than in a first lead-out area provided along the inner circumference of the second lead-out area, first recording area provided along the inner circumference of the first lead-out area and a first lead-in area provided along the inner circumference of the first recording area.

Also the above object can be attained by providing an optical disc recording method including, according to the present invention, steps of forming a first lead-in area and first lead-out area at a first track pitch from the inner circumference of an optical disc toward the outer circumference, forming a second lead-in area, second recording area and a second lead-out area at a smaller second track pitch than in the first track pitch toward the outer circumference of the first lead-out area; and recording, to the first lead-in area, at least identification data for the existence of the second recording area.

In the above optical disc, the first lead-in area has recorded therein medium identification data indicating that the track pitch of the second lead-in area, second recording area and second lead-out area is smaller than in the first lead-in area, first recording area and first lead-out area.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

Figure 1:
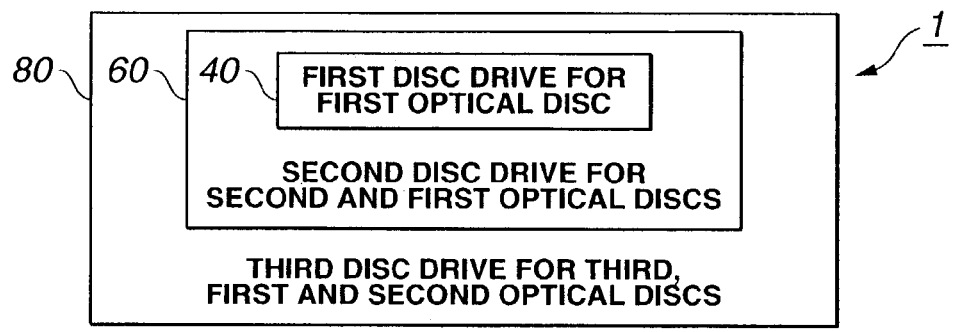
FIG. 1 explains the optical disc playback system according to the present invention.

Referring now to FIG. 1, there is schematically illustrated the optical disc playback system according to the present invention. The optical disc playback system is generally indicated with a reference 1. The optical disc playback system 1 includes a first optical disc player 40 capable of playing back a first optical disc, a second optical disc player 60 capable of playing back the first optical disc and a second optical disc having data recorded therein in a format different from a one in which data is recorded in the first optical disc, and a third optical disc player 80 capable of playing back, in addition to the first and second optical discs, a third optical disc having data recorded therein in formats different from ones in which data are recorded in the first and second optical discs.

In the present invention, the first optical disc is a CD-DA (Compact Disc-Digital Audio) disc having a first data such as audio data, and the first optical disc player 40 is dedicated to playback of the first optical disc.

Also in the present invention, the second optical disc includes a CD-ROM (Compact Disc-Read-Only Memory) disc having data recorded in an array different from a one in the first data, such as computer program, computer-processed data, etc., CD-R (Compact Disc-Recordable) disc, CD-RW (Compact Disc-Rewritable) disc, etc. Each of the optical discs of the second type has data recorded therein at the same track pitch as a one in which data is recorded in the first optical disc. The second optical disc may be either a single-session type optical disc having a session consisting of a lead-in area, a data area following the lead-in area, and a lead-out area following the data area or a multi-session type optical disc having multiple sessions. For example, the compact disc of the multi-session type is a CD-Extra disc or the like having audio data or the like recorded in a first session defined along the inner circumference and computer program or the like recorded in a second session defined along the outer circumference. It should be noted that the number of sessions in the multi-session type optical disc included in the second optical discs is not limited to two as above but it may be more than two. The second optical disc player 60 is installed in a PC or the like for example and can play back the second optical disc as well as the first optical disc. It should be noted that the second optical disc player 60 may be an optical disc recorder/player having also a function to record data to a CD-R or CD-RW disc in addition to the function of playing back such an optical disc.

Further, in the present invention, the third optical disc is a multi-session type optical disc having a first session defined along the inner circumference thereof and a second session defined along the outer circumference. The first session has a first data recorded therein at the same track pitch as in the first and second optical discs, and the second session defined along the outer circumference has a third data recorded therein at a smaller track pitch and with a higher density than in the first and second optical discs. For example, the track pitch in the first session is the same as in the first and second optical discs, that is, 1.5 to 1.6 µm. Audio data, video data or the like is recorded in the first session while audio data or the like higher in quality than the audio data recorded in the first data area 2b. It should be noted that the number of sessions in the third optical disc is not limited to two but it may be more than two and that the third optical disc may be a recordable optical disc. The third optical disc player 80 can play back the third optical disc as well as the first and second optical discs, that is, it can read data from an area in which data is recorded at a smaller track pitch, and with a higher density, than in the first and second optical discs, namely, from a second data area of the second session.

In the aforementioned optical disc playback system 1, the copyrighter of a content recorded in the third optical disc loaded in the second optical disc player 60 can be protected by inhibiting the second optical disc player 60 from reading the data from the third optical disc. More particularly, since data is recorded in the first session of the third optical disc loaded in the second optical disc player 60 at the same track pitch as in the first or second optical disc, data can be read from the first session but data cannot be read from the second session because the data is recorded in the second session of the third optical disc at a smaller track pitch than in the first session.

Figure 2:
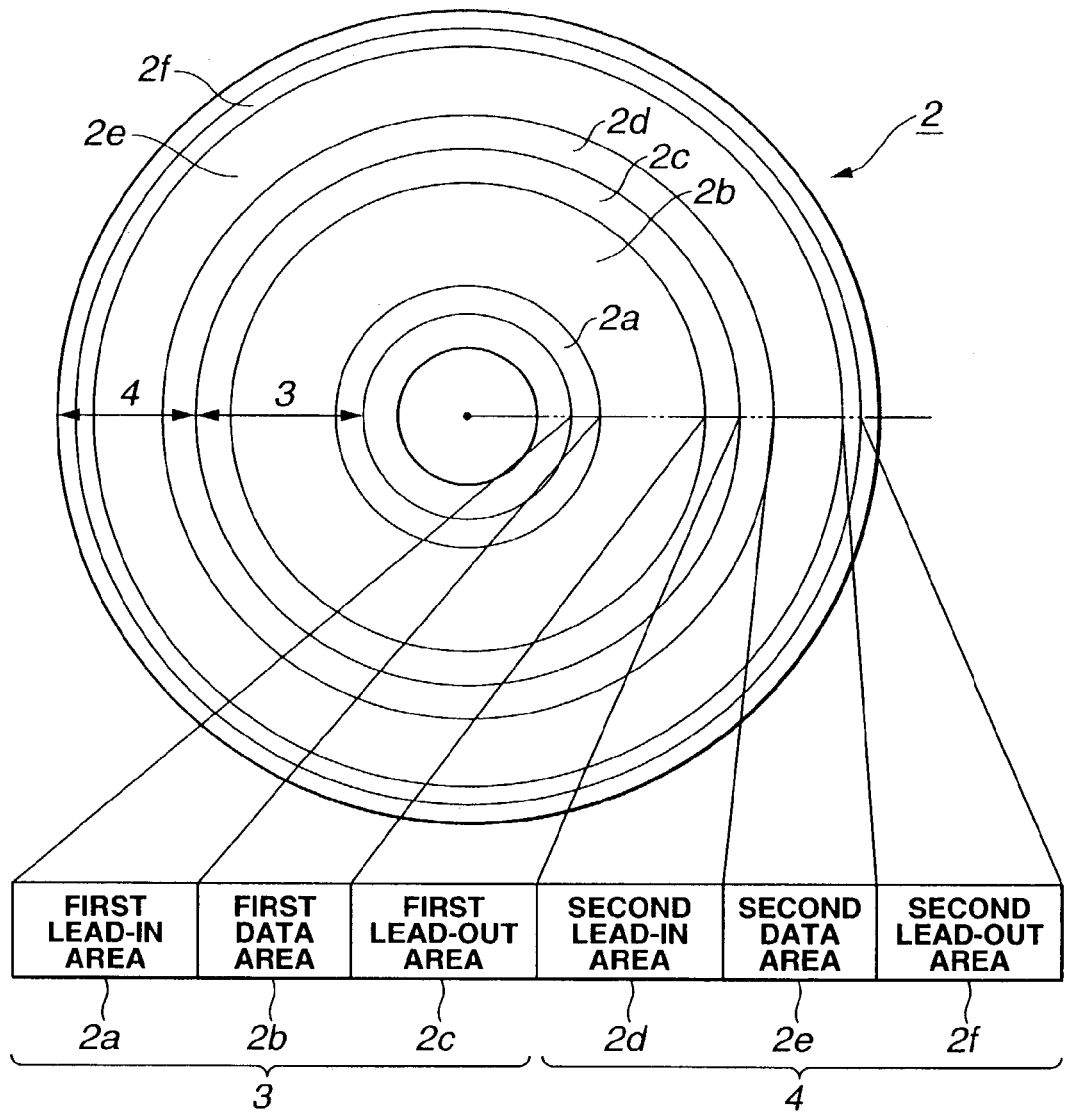
FIG. 2 is a plan view of a third optical disc according to the present invention.

Next, the third optical disc, generally indicated with a reference 2, according to the present invention will be described with reference to FIG. 2. The third optical disc 2 is a read-only optical disc composed of a disc substrate formed from a synthetic resin such as polycarbonate and on which a train of pits corresponding to recording data is stamped by a stamper, a reflective layer formed on the side of the disc substrate on which the train of pits is formed, and a protective layer formed on the reflective layer. As shown in FIG. 2, the third optical disc 2 has provided thereon a first lead-in area 2a formed around the center hole in the optical disc and which is to be a first TOC (table of contents) area, a first data area 2b provided along the outer circumference of the first lead-in area 2a and to which a first or second data is to be recorded, a first lead-out area 2c provided along the outer circumference of the first data area 2b, a second lead-in area 2d provided along the outer circumference of the first lead-in area 2c and which is to be a second TOC area, a second data area 2e provided along the outer circumference of the second lead-in area 2d and to which a third data is to be recorded, and a second lead-out area 2f provided along the outer circumference of the second data area 2e. That is, the third optical disc 2 is a multi-session type disc-shaped recording medium having a first session 3 defined along the inner circumference thereof and consisting of the first lead-in area 2a, first data area 2b and first lead-out area 2d and also a second session 4 defined along the outer circumference and consisting of the second lead-in area 2d, second data area 2e and second lead-out area 2f.

Figures 3, 4:
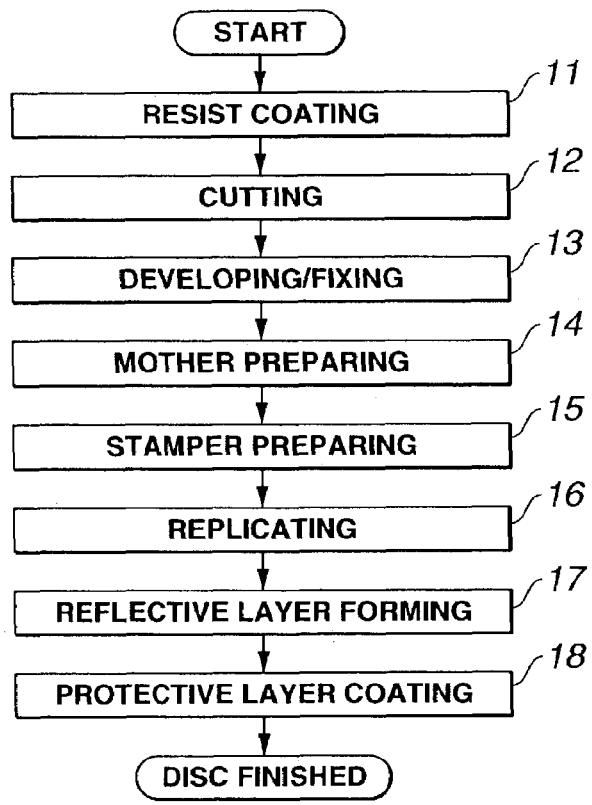
FIG. 3 explains the Q subcode in the third optical disc.
FIG. 4 shows a flow of operations made in production of the third optical disc.

As shown in FIG. 3, in the above third optical disc 2, the track pitch in the first session 3 is the same as in the first and second optical discs, while the track pitch in the second session 4 is smaller than in the first session 3 and the recording density is lower than in the first session 3. To the first data area 2b, there are to be recorded audio data which is a first data, and computer program, computer-processed audio data, computer-processed video data or the like which is a second data, for example. To the second data area 2e, there is to be recorded high-quality audio data or the like which is more valuable than audio data recorded in the first data area 2b, for example. It should be noted that the "quality audio data" referred to herein is data whose sampling rate is higher than that for the first data or whose quantizing step size is smaller than that of the first data.

Next, the Q subcode in the first lead-in area 2a of the third optical disc 2 will be described with reference to FIG. 3. The Q subcode includes a 2-bit sync block SYNC, 4-bit control block CNT, address block ADR, 4-bit track number block TNO, 8-bit point block POINT, 24-bit elapsed time block TIME, 8-bit zero block ZERO (in which "0" is recorded), 24-bit primary time block PTIME, and a 16-bit error detection block CRC.

The elapsed time block TIME consists of an 8-bit minutes block MIN indicating minutes of an elapsed time, 8-bit seconds block SEC indicating seconds of the elapsed time, and an 8-bit frame block FRAME indicating a frame number. The primary time block PTIME also consists of an 8-bit minutes block PMIN indicating minutes of a primary time, 8-bit seconds block PSEC indicating seconds of the primary time, and an 8-bit frame block PFRAME indicating a frame number.

The control block CNT has recorded therein a number of channels and pre-emphasis selection data. It has also recorded therein identification data for identifying which the third optical disc 2 is, a one for computer program, computer-processed data or the like or a one dedicated for audio data. It should be noted that the second optical disc has recorded in the control block CNT thereof identification data for identifying the optical disc 2 itself and the first optical disc for audio data.

The address block ADR has recorded therein identification data for a format including the track number block TNO, point block POINT, elapsed time block TIME, zero block ZERO and primary time block PTIME. It has also recorded therein identification data for identifying which the third optical disc 2 is, a multi-session type one or single-session type one.

The track number block TNO is an area where a track number is recorded, and the lead-in area has "00" recorded therein. It should be noted that the track number block TNO may have recorded therein identification data for discriminating the first and second optical discs from the third optical disc 2.

The point block POINT has recorded therein data for defining contents of record in the minutes block PMIN, seconds block PSEC and frame block PFRAME.

Each of the minutes block MIN, seconds block SEC and frame block FRAME included in the elapsed time block TIME has an absolute time (absolute address) recorded therein.

The zero block ZERO in the third optical disc 2 has recorded therein identification data for discriminating the first and second optical discs from the third optical disc 2. Of course, the identification data may be recorded in the track number block TNO as mentioned above.

Each of the minutes block PMIN, seconds block PSEC and frame block PFRAME included in the primary time block PTIME has content data recorded therein based on the definitions in the point block POINT.

More particularly, the third optical disc 2 of the multi-session type has recorded therein the first track number and last track number in the first data area 2b, leading address in the first lead-out area 2d, data on whether there is a next session, leading address and first track number in the second lead-in area 2d of the second session 4, etc. It should be noted that the second optical disc of the multi-session type has similar data recorded therein.

The error detection block CRC has recorded therein error detection code such as CRC (Cyclic Redundancy Code) or the like. The error detection block CRC detected any error in the control block CNT, address block ADR, track number block TNO, point block POINT, elapsed time block TIME, zero block ZERO and primary time block PTIME.

Note that the identification data indicating which the third optical disc 2, a multi-session type one or a single-session type one, may be recorded in the address block ADR of the Q subcode in the first lead-in area 2a as well as that of the Q subcode in the first data area 2b and first lead-out data 2c. Also, it should be noted that also the identification data for discriminating the third optical disc 2 from the first and second optical discs may be recorded in the track number block TNO and zero block ZERO in the Q subcode in the first data area 2b and first lead-out area 2c.

In the aforementioned third optical disc 2, the address block ADR of the Q subcode in the first lead-in area 2a has recorded therein identification data indicating which the third optical disc 2 is, a multi-session type one or single-session type one. So, when the third optical disc 2 is loaded in the second optical disc player 60 or third optical disc player 80, data reading can preferentially be started at the second session 4. Solely in the third optical disc player 80, data reading can be made from a recording area of the third optical disc 2, namely, from the second session 4, in which the track pitch is smaller than in the first and second optical discs. In the second optical disc player 60, however, since the track pitch in the second session 4 is smaller than in the first session 3, data reading cannot be made from the second session 4.

In the first lead-in area 2a of the third optical disc 2, the track number block TNO and zero block ZERO of the Q subcode have recorded therein identification data for discriminating the third optical disc 2 from the first and second optical discs 5 and 6. Thus, the third optical disc player 80 can preferentially read from the second session 4 in the third optical disc 2, and the second optical disc player 60 capable of reading the identification data can preferentially read data from the third optical disc 2. Since th track pitch in the first session 3 is the same as in the first and second optical discs, the second optical disc player 60 cannot read data from the first session 3.

Next, how to produce the third optical disc 2 according to the present invention will be described with reference to FIG. 4. As shown, a glass disc is coated with a photoresist in a photoresist coating step 11, and a pattern of pits corresponding to data to be recorded is cut in the resist coating by modulating laser light emitted from a laser source in a cutting step 12 to provide a master. Next, the master on which the pit pattern has been formed by the laser cutting is conveyed to a developing/fixing step 13 where the photoresist is developed and fixed. Thereafter, in a mother preparing step 14, the master is plated on the surface to provide a mother. Next, in a stamper preparing step 15, the mother is used to provide a stamper. In a replicating step 16, the stamper is placed in a mold and a transparent resin such as polycarbonate or acryl is injected into the mold by an injection molding machine to produce a replica. The pit pattern formed on the master in the cutting step 12 is stamped on one side of the replica thus prepared. Next in a reflective layer forming step 17, a reflective layer is formed by sputtering or the like on the side of the replica on which the pit pattern is formed.

Figure 5:
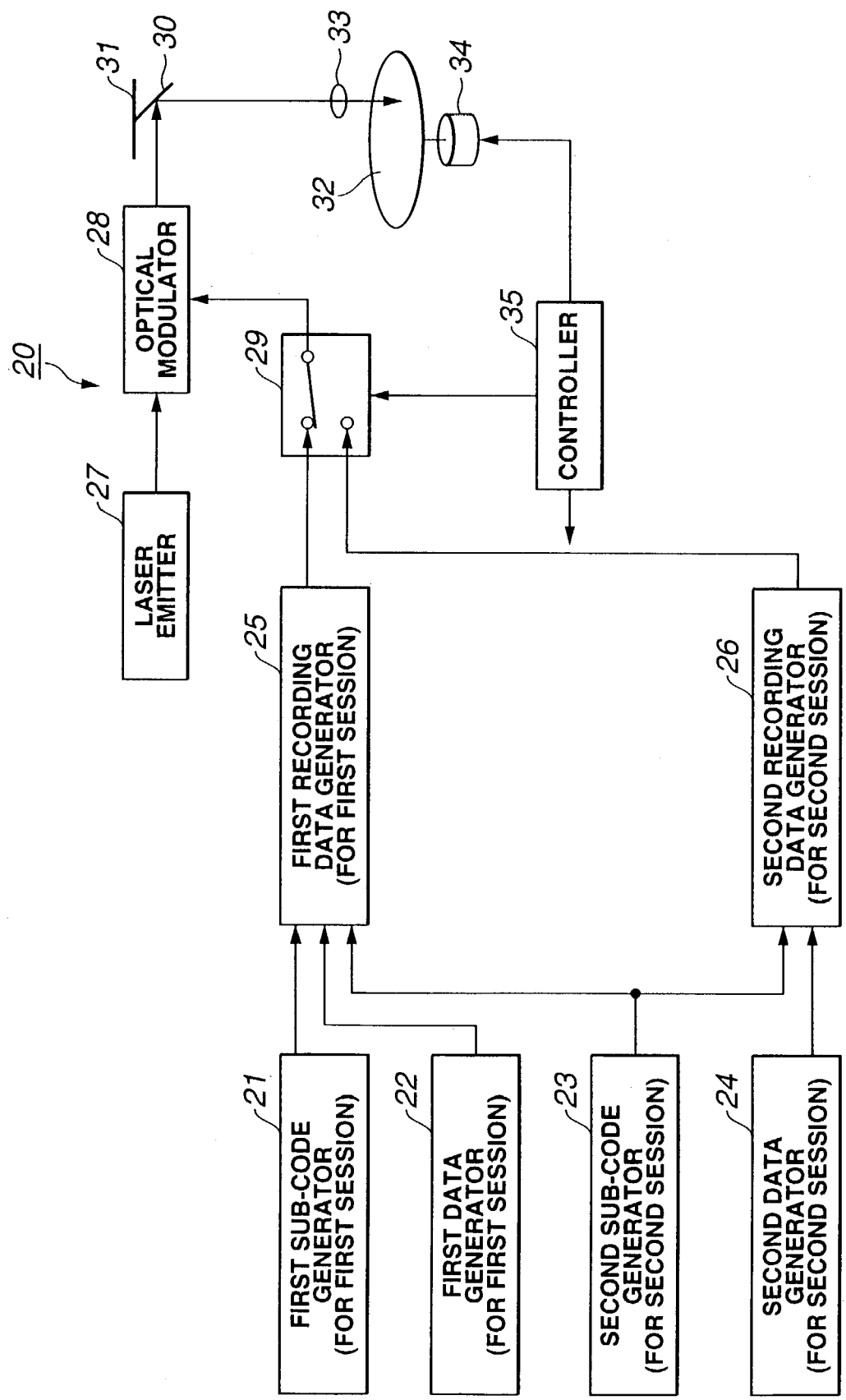
FIG. 5 is a block diagram of a cutting apparatus to produce the glass disc used in production of the third optical disc.

Next, in a protective layer coating step 18, the reflective layer formed in the reflecting layer forming step 17 is coated with a UV-setting resin by spin coating and irradiated with UV (ultraviolet rays) to form a protective layer. For data reading, the third optical disc 2 thus produced is irradiated with a light beam at a side thereof opposite to the side on which the protective layer is formed Referring now to FIG. 5, there is schematically illustrated in the form of a block diagram a cutting apparatus to produce a master by cutting a pit pattern corresponding to data to be recorded with a laser light in the aforementioned cutting step 12 in production of the third optical disc 2. The cutting apparatus is generally indicated with a reference 20. As shown, the cutting apparatus 20 includes a first data generator 21 to generate a first data to be recorded to the first session 3 of the third optical disc 2, for example, data error-corrected by Cross Interleave Reed-Solomon Code (CIRC) or the like and modulated by EFM (Eight to Fourteen Modulation) or the like, a first subcode generator 22 to generate a subcode to be recorded to the first session 3 (as shown in FIG. 3), a second data generator 23 to generate a third data to be recorded to the second session 4 of the third optical disc 2, for example, error-corrected and modulated high quality audio data or the like, a second subcode generator 24 to generate a subcode to be recorded to the second session 4, a first recording data generator 25 to generate data to be recorded to the first session 3 by mixing together data output from the first data generator 21 and data generated by the first subcode generator 22, and a second recording data generator 26 to generate data to be recorded to the second session 4 by mixing together data output from the second data generator 23 and data generated by the second subcode generator 24.

The cutting apparatus 20 further includes a laser emitter 27 formed from a gas laser source such as argon laser, He—Cd laser or the like, an optical modulator 28 such as EOM (Electro-Optical Modulator) using the Pockels effect or AOM (Acoustic-Optical Modulator) using ultrasound to modulate laser light emitted from the emitter 27 based on recording data, a switch 29 to selectively output recording data generated by the first recording data generator 25 or recording data generated by the second recording data generator 26 to the optical modulator 28, a mirror 30 to deflect the optical path by reflecting the laser light modulated by the optical modulator 28, a mechanism 31 to move the mirror 30, an objective lens 33 to collect the laser light reflected by the mirror 30 and irradiate it to a glass disc 32, a motor 34 to rotate the glass disc 32, and a controller 35 to control the system operation.

The cutting apparatus 20 constructed as above functions as will be described below. First, a pit pattern corresponding to a first data to be recorded to the first session 3 in the third optical disc 2 is provided along the inner circumference of the glass disc 32, and then a pit pattern corresponding to a second data to be recorded to the second session 4 in the third optical disc 2 is formed contiguous to the former pit pattern and along the outer circumference of the glass disc 32. More specifically, the first data generator 21 makes error-correction coding, by CIRC or the like, and modulation, by EFM or the like, of data to generate data to be recorded to the first session 3 in the third optical disc 2. At the same time, the first subcode generator 22 generates a subcode for the data which is to be recorded to the first session 3. Particularly, the first subcode generator 22 generates data about the Q subcode shown in FIG. 3 and including identification data for indicating which the third optical disc 2 is, a multi-session type optical disc or a single-session optical disc and identification data for discriminating the third optical disc 2 from the first and second optical discs 5 and 6. The second data generator 23 makes error-correction coding, by CIRC or the like, and modulation, by EFM or the like, of data to generate data to be recorded to the second session 4 in the third optical disc 2. At the same time, the second subcode generator 24 generates a subcode for the data which is to be recorded to the second session 4.

First, for recording, to the glass disc 32, data to be recorded to the first session 3 in the third optical disc 2, the first recording data generator 25 is supplied with the data generated by the first data generator 21 and a subcode generated by the first subcode generator 22, and also with a part of the subcode generated by the second subcode generator 24 for recording to the second session 4 so that the addresses in the entire disc can be identified with data recorded in the TOC area in the first session 3. The first recording data generator 25 mixes together the data from the first data generator 21, subcode from the first subcode generator 22 and subcode from the second subcode generator 23 to generate data to be recorded to the first session 3 and provide the data to the optical modulator 28. At this time, the controller 35 controls the switch 29 to connect the first recording data generator 25 and optical modulator 28 to each other. On the other hand, the laser emitter 27 emits laser light which will be passed to the optical modulator 28. The optical modulator 28 modules the laser light based on the recording data supplied from the first recording data generator 25 in such a manner that a standard recording density can be attained. The laser light modulated by the optical modulator 28 is incident upon the mirror 30. The mirror 30 is moved by the mirror moving mechanism 31 to permit to scan the laser light between the inner and outer circumferences of the glass disc 32. The laser light reflected by the mirror 30 is condensed by the objective lens 33 and projected onto the glass disc 32 being rotated by the motor 34. Thus, the glass disc 32 is cut correspondingly to the recording data to form a latent image of the pit pattern.

For recording, to the glass disc 32, data to be recorded to the second session 4 in the third optical disc 2 contiguously to the above data to be recorded to the first session 3, the second recording data generator 26 is supplied with the data generated by the second data generator 23 and subcode generated by the second subcode generator 24. The second recording data generator 26 mixes together the data from the second data generator 23 and subcode from the second subcode generator 24 to generate data to be recorded to the second session 4 and provide the data to the optical modulator 28. At this time, the controller 35 controls the switch 29 to connect the second recording data generator 26 and optical modulator 28 to each other. Thus, the optical modulator 28 modulates the laser light emitted from the laser emitter 27 based on the recording data supplied from the second recording data generator 26 in such a manner that the track pitch in the second session 4 will be smaller than in the first session 3. The laser light modulated by the optical modulator 28 is incident upon the mirror 30. The laser light has the optical path thereof bent by the mirror 30, while the mirror 30 is moved by the mirror moving mechanism 31 so that the track pitch in the second session 4 will be smaller than in the first session 3, thereby permitting to scan the laser beam between the inner and outer circumferences of the glass disc 32. The laser light is condensed by the objective lens 33 and projected onto the glass disc 32 being rotated by the motor 34. Thus, the glass disc 32 is cut correspondingly to the recording data to form the pit pattern.

The stamper prepared in the stamper preparing step 15 in FIG. 4 is formed from the glass disc 32 formed by the aforementioned cutting apparatus 20 following the steps in FIG. 4.

Next, there will be described the first optical disc player 40 capable of playing back the first optical disc, the second optical disc player 60 capable of playing back the first and second optical discs, and the third optical disc player 80 capable of playing back the third optical disc 2 as well as the first and second optical discs, all included in the optical disc playback system 1.

Figure 6:
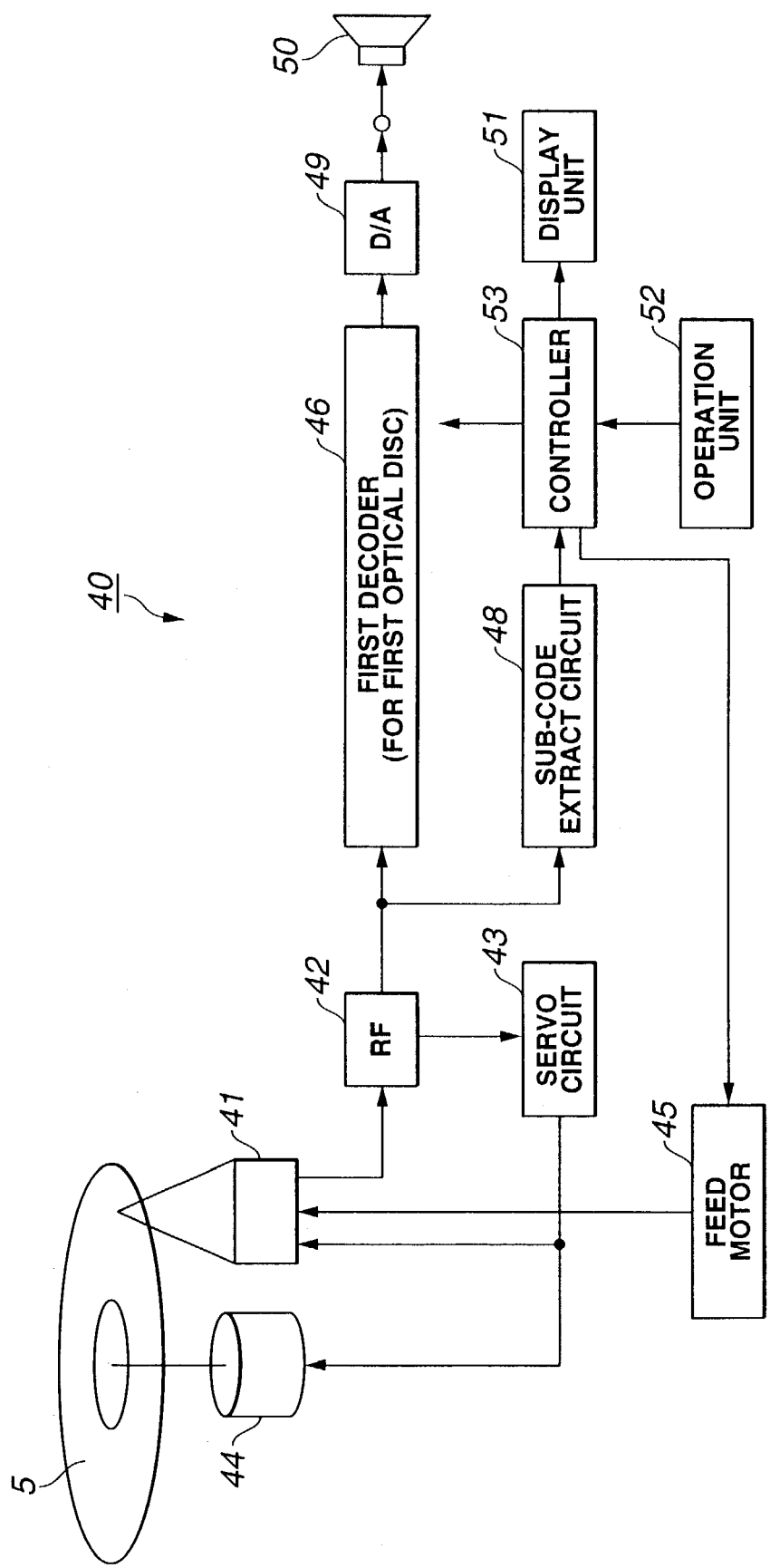
FIG. 6 is a block diagram of a first optical disc player capable of playing back a first optical disc such as a CD-DA disc.

As shown in FIG. 6, the first optical disc player 40 for playback of a first optical disc 5 includes an optical pickup 41 to read data recorded in the first optical disc 5, an RF circuit 42 which is supplied with an output from the optical pickup 41, a servo circuit 43 to produce focusing servo signal and tracking servo signal for the objective lens based on the output from the RF circuit 42, a drive motor 44 to rotate a first optical disc 5 at a constant linear velocity, and a feed motor 45 to move optical pickup 41 radially of the first optical disc 5.

The first optical disc player 40 further includes a first decoder 46 to subject the output from the RF circuit 42 to decoding processes such as demodulation, error correction, de-interleaving, etc., a subcode extraction circuit 48 to extract subcodes from the output from the RF circuit 42, a D/A converter 49 to convert the digital data decoded in the first decoder 46 to analog data, a speaker 50 to output audio data etc. converted to the analog data, a display unit 51 to display address information etc., an operation unit 52 provided with a play button, forward track jump button, backward track jump button, play stop button, etc. which are to be operated by the user, and a controller 53 to control the operation of the entire first optical disc player 40. The controller 53 includes a microcomputer.

The RF circuit 42 produces RF signal, focusing error signal and tracking error signal based on the output signal from a photodetector (not shown) included in the optical pickup 41. For example, the focusing error signal is produced by the so-called astigmatism method, and the tracking error signal is produced by the so-called 3-beam method or push-pull method. The RF circuit 42 provides the RF signal to the first decoder 46 while providing the focusing error signal and tracking error signal to the servo circuit 43.

The servo circuit 43 produces servo signal for use to play back the first optical disc 5. More specifically, the servo circuit 43 produces focusing servo signal based on the supplied focusing error signal so that the focusing error signal will be "0", and it also produces tracking servo signal based on the supplied tracking error signal so that the tracking error signal will be "0". The servo circuit 43 supplies the thus produced focusing and tracking servo signals to a drive circuit for an objective lens drive mechanism (not shown) of the optical pickup 41. The drive circuit drives the objective lens drive mechanism (not shown) of the optical pickup 41 based on the supplied focusing and tracking servo signals. The objective lens drive mechanism drives the objective lens. More specifically, the drive circuit drives the objective lens drive mechanism based on the supplied focusing servo signal to move the objective lens in a focusing direction parallel to the optical axis of the objective lens, and based on the supplied tracking servo signal to the objective lens in a tracking direction orthogonal to the optical axis of the objective lens. The servo circuit 43 provides the drive motor 44 with servo signal for servo control of the drive motor 44 to drive the drive motor 44 to rotate the first optical disc 5 at a constant linear velocity, for example. A disc table to rotate the optical disc is fixed to the rotation shaft of the drive motor 44. The first optical disc 5 is set on the disc table, and rotated along with the disc table.

The first decoder 46 is dedicated to decoding of the first data read from the first optical disc 5. More particularly, the first decoder 46 demodulates EFM-modulated audio data from the RF circuit 42 and subjects the data to decoding processes such as error correction by CIRC or the like and de-interleaving. The first decoder 46 provides the decoded audio data etc. to the D/A converter 49.

The subcode extraction circuit 48 is provided to extract, from the RF signal produced by the RF circuit 42, P and Q subcodes recorded in the TOC area, data area and lead-out area. The subcode extraction circuit 48 provides the subcodes extracted from the TOC data, namely, address information, track number, etc. to the controller 53.

The controller 53 controls the entire first optical disc player 40. More particularly, the controller 53 provides the address information, track number, etc. supplied from the subcode extraction circuit 48 to the display unit 51 and causes the display unit 51 to display the address information, track number, etc. Supplied with control signal from the operation unit 52 operated by the user, the controller 53 selects an operation of the first optical disc player 40 according to the input control signal and controls the first optical disc player 40.

For example, when supplied with play start signal from the operation unit 52, the controller 53 controls the feed motor 45 to move the optical pickup 41 to the lead-in area so that the optical pickup 41 can read TOC data such as subcodes from the lead-in area provided along the innermost circumference of the first optical disc 5, in order to start reading audio data etc. from the first track.

The first optical disc player 40 constructed as above functions as will be described below. For example, when a play start button on the operation unit 52 is pressed by the user, the controller 53 will drive the drive motor 44 to rotate the first optical disc 5 at a constant linear velocity of rotation, and put the feed motor 45 into operation to move the optical pickup 41 to read TOC data such as subcodes from the lead-in area of the first optical disc 5. The optical pickup 41 having been moved to a position where it is opposite to the lead-in area will irradiate light beam to the signal recording surface of the first optical disc 5. The return light from the signal recording surface of the first optical disc 5 is converted to electric signal by a photodetector (not shown) of the optical pickup 41. The photodetector provides the electric signal to the RF circuit 42. The RF circuit 42 produces RF signal and provides it to the first decoder 46 while producing focusing and tracking error signals and providing them to the servo circuit 43.

The servo circuit 43 produces focusing and tracking servo signals based on the input focusing and tracking error signals and provides the error signals to the drive circuit of the objective lens drive mechanism (not shown) of the optical pickup 41. The optical pickup 41 drives the objective lens drive mechanism (not shown) to move the objective lens in the direction of the optical axis of the light beam for focusing control and in a direction orthogonal to the optical axis of the light beam for tracking control.

The subcode extraction circuit 48 is provided to extract subcodes from the RF signal, and provides it to the controller 53. The controller 53 controls the system operation based on the input subcode. For example, the first decoder 46 makes demodulation, error correction and de-interleaving of the RF signal supplied from the RF circuit 42, and provides the processed RF signal to the D/A converter 49. The D/A converter 49 converts the digital signal to analog signal, and provides the analog signal to the speaker 50. The speaker 50 converts the analog signal to a sound and outputs it as a audible sound. The controller 53 controls the display unit 51 to display the address information, track number, etc. extracted from the subcode.

Figure 7:
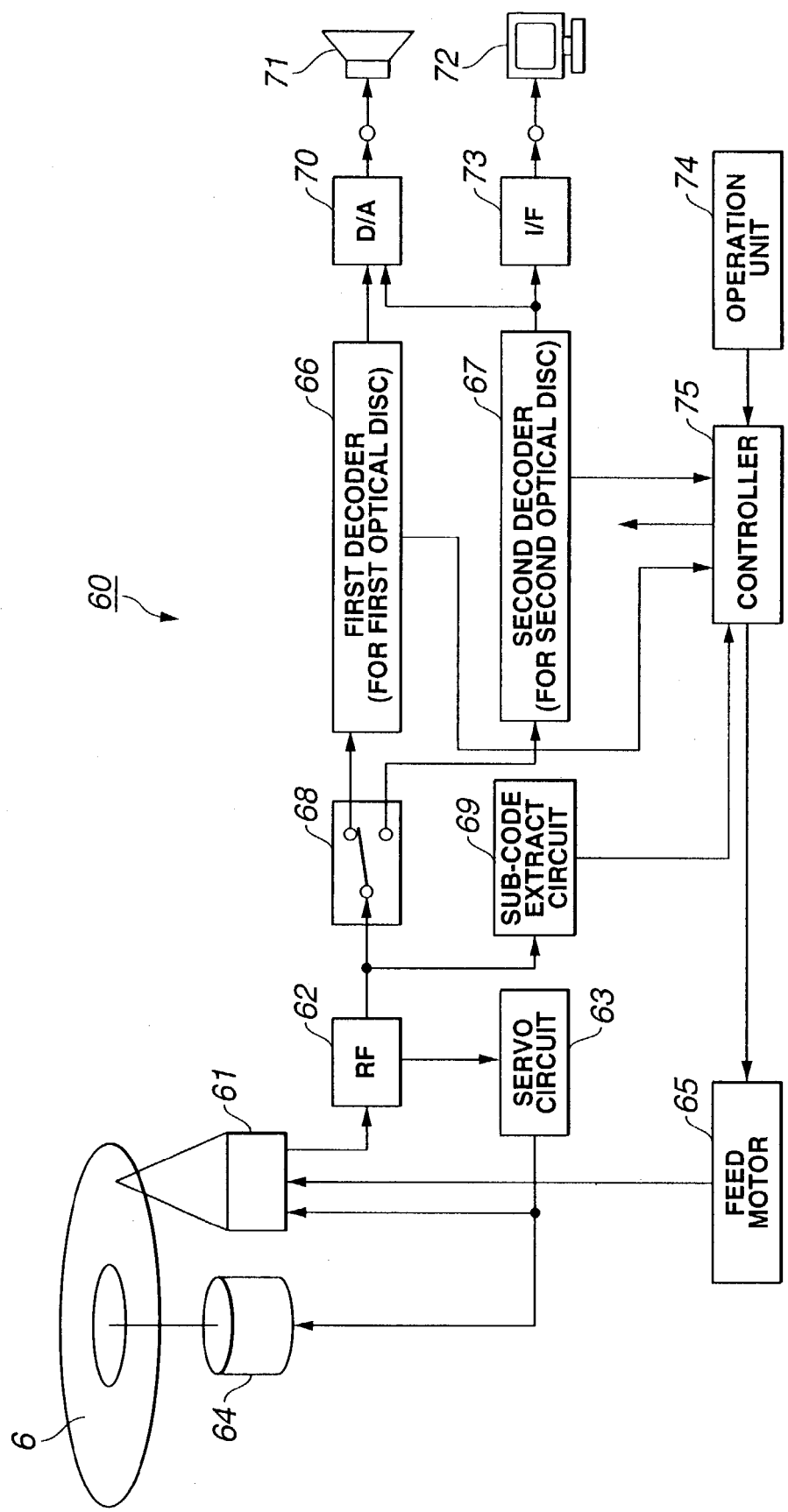
FIG. 7 is a block diagram of a second optical disc player capable of playing back both a first optical disc and a second optical disc such as a CD-ROM disc.

Next, there will be described the second optical disc player 60 adapted to play back the first optical disc 5 and second optical disc 6. According to the present invention, the second optical disc player 60 is normally used in a PC or the like. As shown in FIG. 7, the second optical disc player 60 includes an optical pickup 61 to read data recorded in the first optical disc 5 and second optical disc 6, an RF circuit 62 which is supplied with an output from the optical pickup 61, a servo circuit 63 to produce focusing servo signal and tracking servo signal for a objective lens (not shown) provided in the optical pickup 61 based on the output from the RF circuit 62, a drive motor 64 to rotate a first optical disc 5 or second optical disc 6 at a constant linear velocity, and a feed motor 65 to move the optical pickup 61 radially of the first optical disc 5 and second optical disc 6.

The second optical disc player 60 further includes a first decoder 66 to subject the output from the RF circuit 62, corresponding to a signal read from the first optical disc 5, to decoding processes such as demodulation, error correction, de-interleaving, etc., a second decoder 67 to subject the output from the RF circuit 62, corresponding to a signal read from the second optical disc 6, to decoding processes such as demodulation, error correction, de-interleaving, etc., a switch 68 to selectively connect the output from the RF circuit 62 to any of the first and second decoders 66 and 67, a subcode extraction circuit 69 to extract subcodes from the TOC data read from the first and second optical discs 5 and 6 and supplied from the RF circuit 62, a D/A converter 70 to convert the digital data decoded in the first and second decoders 66 and 67 to analog data, a speaker 71 to output audio data etc. converted to the analog data, a monitor 72 to display address information, track number, etc. recorded in the first optical disc 5 and also data based on a computer program, etc. recorded in the second optical disc 6, an interface (will be referred to simply as "I/F" hereunder) 73 providing a connection between the second decoder 67 and monitor 72, an operation unit 74 including a mouse, keyboard, ten keys, etc. to be operated by the user, and a controller 75 to control the system operation. The controller 75 includes a microcomputer.

As above, the second optical disc player 60 is different from the first optical disc player 40 in that it additionally includes the second decoder 67 to play back the second optical disc 6 and switch 68 to select either the first and second decoders 66 and 67. It should be noted that the same circuits in the second optical disc player 60 as in the first optical disc player 40 will not be described any more.

The second decoder 67 is provided to demodulate second data such as computer program etc. recorded in the second optical disc 6 and having been read from the second optical disc 6 and EFM-modulated and supplied from the RF circuit 62, and subjects the demodulated second data to decoding processes such as error correction and de-interleaving. The second decoder 67 provides the decoded data to either the I/F 73 or D/A converter 70 depending upon the type of the data.

For playback of the first optical disc 5, the switch 68 connects the RF circuit 62 and first decoder 66 to each other for the RF signal to be supplied from the RF circuit 62 to the first decoder 66. For playing back the second optical disc 6, the switch 68 will make a connection between the RF circuit 62 and second decoder 67 for the RF signal to go from the RF circuit 62 to the second decoder 67.

The controller 75 provides a control as follows in addition to the control by the controller 53 of the first optical disc player 40. That is, when supplied with the sib-code data read from the first and second optical discs 5 and 6, which is supplied from the subcode extraction circuit 69, the controller 75 determines, based on the subcode, the optical disc set on the disc table to be the first optical disc 5 or second optical disc 6. More specifically, when there is detected the identification data for the second optical disc 6, recorded in the control block CNT of the Q subcode included in the TOC data as shown in FIG. 3, the controller 75 will control the switch 68 to connect the RF circuit 62 and second decoder 67 to each other.

Also, when there is detected the identification data for the multi-session type optical disc, recorded in the address block ADR of the Q subcode included in the TOC data as shown in FIG. 3, the controller 75 will control the feed motor 65 to move the optical pickup 61 to a position where it will be able to read data recorded in the lead-in area in the second session 4 defined along the outer circumference so that data can preferentially be read from the second session 4 defined along the outer circumference.

Further, when the optical disc to be played back is determined to be of the multi-session type and reading of the second session 4 defined along the outer circumference is started, the controller 75 will determine, based on the identification data indicating the type of data recorded in the control block CNT in the subcode included in the TOC data recorded in the lead-in area of the second session 4, which can decode the data read from the second session 4, the first decoder 66 or second decoder 67. It should be noted that the system may be adapted such that for determination of the first decoder 66 or second decoder 67 to be an appropriate one, the controller 75 causes both the first decoder 66 and second decoder 67 to decode the data on trial by controlling the switch 68 to select each of the decoders. When the controller 75 determines that neither the first decoder 66 nor the second decoder 67 can decode the data, it will stop the optical pickup 61 from playback operation and the drive motor 64 from driving, and eject the loaded optical disc from the second optical disc player 60.

When the controller 75 determines that the optical disc loaded in the apparatus 60 is of the multi-session type, the controller 75 may control the second optical disc player 60 as follows. That is, the controller 75 controls the feed motor 65 to move the optical pickup 61 to a position where it will be able to read the TOC data recorded in the lead-in area of the first session 3 defined along the inner circumference so that reading data from the first session 3 defined along the inner circumference will be started when it is detected at the start of reading the second session 4 defined along the outer circumference that the second decoder 67 cannot decode the data.

The controller 75 controls the feed motor 65 to move the optical pickup 61 to a position where it will be able to read the TOC data recorded in the lead-in area in the first session 3 defined along the inner circumference so that data will be read from the first session 3 defined along the inner circumference without access to the second session 4 defined along the outer circumference when it is detected based on the data read from the address block ADR in the subcode that the optical disc to be played back is of the multi-session type and also there is detected from the zero block ZERO identification data for the third optical disc 2.

The second optical disc player 60 constructed as above functions as will be described below. For example, when a play start button on the operation unit 74 is pressed by the user, the controller 75 will drive the drive motor 64 to rotate the loaded optical disc at a constant linear velocity of rotation, and put the feed motor 65 into operation to move the optical pickup 61 to read TOC data such as subcodes from the lead-in area provided along the innermost circumference of the first optical disc 5. The optical pickup 61 detects return light from the optical disc by a photodetector of the optical pickup 61, converts it to electric signal and provides the signal to the RF circuit 62. The subcode extraction circuit 69 provides extracted subcode to the controller 75. The controller 75 determines, based on the identification data recorded in the control block CNT in the subcode, which the optical disc set on the disc table is, the first optical disc 5 or second optical disc 6, and also based on the identification data recorded in the address block ADR in the subcode, which the optical disc is, the multi-session type or single-session type.

When the identification data for the second optical disc 6 has not been detected from the control block CNT in the subcode recorded in the lead-in area, the controller 75 determines that the optical disc set on the disc table is the first optical disc 5 and controls the switch 68 to make a connection between the RF circuit 62 and first decoder 66. Similarly to the first optical disc player 40, the second optical disc player 60 decodes the read first data by the first decoder 66 and provides the decoded data from the speaker 71 via the D/A converter 70.

When it is determined based on the data in the control block CNT in the subcode recorded in the lead-in area, the controller 75 determines that the second optical disc 6 is set on the disc table and controls the switch 68 to make a connection between the RF circuit 62 and second decoder 67. In the second optical disc player 60, the read second data is decoded by the second decoder 67, the decoded data is passed to the monitor 72 via the I/F 73 or it is outputted by the speaker Similarly to the first optical disc player 40, the second optical disc player 60 decodes the read first data by the first decoder 66 and provides the decoded data from the speaker 71 via the D/A converter 70.

Further, when the identification data indicating that the loaded optical disc is of the multi-session type is detected from the address block ADR in the subcode in the lead-in area, the controller 75 drives the feed motor 65 to move the optical pickup 61 to a position where it will be able to read the TOC data such as subcodes from the lead-in area in the second session 4 defined along the outer circumference of the second optical disc 6. The controller 75 determines the type of the decoder based on the identification data in the control block CNT in the subcode recorded in the lead-in area in the second session 4 defined along the outer circumference, and controls the switch 68 to make a connection between the RF circuit 62 and first decoder 66 or second decoder 67. In the second optical disc player 60, the data read from the second session 4 is decoded by the first decoder 66 or second decoder 67, and provided via the I/F 73 to the monitor 72 on which a corresponding display will be made, or via the D/A converter 70 to the speaker 71.

When the operation unit 74 is operated by the user for reading the first session 3 defined along the inner circumference after completion of reading the second session 4 defined along the outer circumference, the controller 75 drives the feed motor 65 to move the optical pickup 61 to a position it will be able to read the TOC data such as subcodes from the lead-in area in the first session 3 defined along the inner circumference of the second optical disc 6. By reading the identification data in the control block CNT in the subcode from the lead-in area in the first session 3 defined along the inner circumference, the controller determines the type of the decoder, and controls the switch 68 to make a connection between the RF circuit 62 and first second 66 or second decoder 67. In the second optical disc player 60, the first data or second data read from the first session 3 is decoded by the first decoder 66, and provided via the I/F 73 to the monitor 72 on which a corresponding display will be made, or via the D/A converter 70 to the speaker 71.

Figure 8:
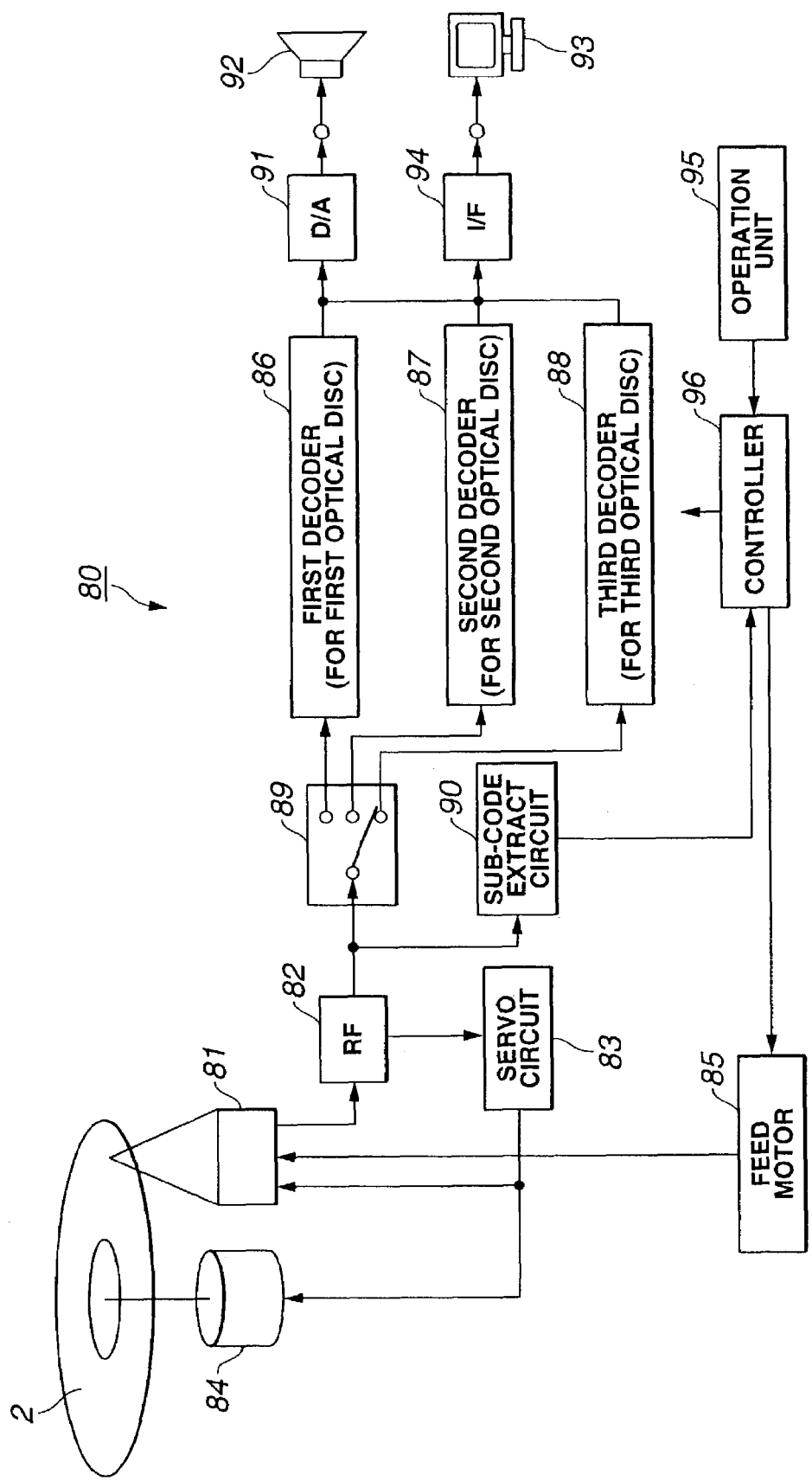
FIG. 8 is a block diagram of a third optical disc player capable of playing back the third optical disc in addition to the first and second optical discs.

Next, there will be described the third optical disc player 80 adapted to read information signals recorded in the first optical disc 5, second optical disc 6 and third optical disc 2. As shown in FIG. 8, the third optical disc player 80 includes an optical pickup 81 to read data recorded in the first, second and third optical discs 5, 6 and 2, an RF circuit 82 which is supplied with an output from the optical pickup 81, a servo circuit 83 to produce focusing and tracking servo signals for the objective lens (not shown) in the optical pickup 81 based on the output from the RF circuit 82, a drive motor 84 to rotate the first, second or third optical disc 5, 6 or 2 at a constant linear velocity, and a feed motor 85 to move the optical pickup 81 radially of the first, second and third optical discs 5, 6 and 2.

The third optical disc player 80 further includes a first decoder 86 to subject the output from the RF circuit 82, which is based on a signal read from the first optical disc 5, to decoding processes including demodulation, error correction, de-interleaving, etc., a second decoder 87 to subject the output from the RF circuit 82, which is based on a signal read from the second optical disc 6, to decoding processes include demodulation, error correction, de-interleaving, etc., a third decoder 88 to subject the output from the RF circuit 82, which is based on a signal read from the third optical disc 2, to decoding processes include demodulation, error correction, de-interleaving, etc., a switch 89 to selectively provide the output from the RF circuit 82 to the first, second or third decoder 86, 87 or 88, a subcode extraction circuit 90 to extract subcodes from the TOC data read from the first, second and third optical discs 5, 6 and 2 and supplied from the RF circuit 82, a D/A converter 91 to convert digital data decoded by the first, second and third decoders 86, 87 and 88 to analog data, a speaker 92 to output audio data etc. converted to the analog signal, a monitor 93 to display address information, track number, etc. recorded in the first optical disc 5 and third optical disc 2 and also display data based on computer program etc. recorded in the second optical disc 6, an interface (will be referred to simply as "I/F" hereunder) 94 to make a connection between the second and third decoders 87 and 88 and the monitor 93, an operation unit 95 including a mouse, keyboard, ten keys, etc. to be operated by the user, and a controller to control the entire optical disc player 80. It should be noted that the controller 96 includes a microcomputer.

As will be known from the above description, the third optical disc player 80 is different from the second optical disc player 60 in that it further includes the third decoder 88 for playback of the third optical disc 2 and the switch 89 is provided to selectively make a connection between the RF circuit 82 and the first, second or third decoder 86, 87 or 88. It should be noted that the same circuits in the third optical disc player 80 as those in the second optical disc player 60 will not be described any more.

The third decoder 88 is provided to demodulate the third data such as high quality audio data etc. recorded in the second session 4 defined along the outer circumference of the third optical disc 2 and having been EFM-modulated and supplied from the RF circuit 42 and subject the data to decoding processes including error correction, de-interleaving and the like. The third decoder 88 provides the decoded third data to either the I/F 94 or D/A converter 91 depending upon the type of the data.

The controller 96 provides a control as follows in addition to the control by the controller 75 of the second optical disc player 60. Namely, when supplied, from the subcode extraction circuit 90, with subcodes read from one of the first, second and third optical discs 5, 6 and 2, which is loaded in the third optical disc player 80, and supplied from the subcode extraction circuit 90, the controller 96 determines, based on the identification data in the control block CNT and zero block ZERO in the subcode, which the optical disc set on the disc table is, the first, second or third optical disc 5, 6 or 2. When there is detected the identification data for the second optical disc 6, recorded in the Q-channel control block CNT in the subcode shown in FIG. 3, the controller 96 will controls the switch 89 to connect the RF circuit 82 and the second decoder 87 to each other. On the other hand, when there is detected the identification data for the third optical disc 2, recorded in the Q-channel zero block ZERO and track number block TNO in the subcode, the controller 96 controls the switch 89 to make a connection between the RF circuit 82 and third decoder 88.

When there is detected identification data for a multi-session type optical disc, recorded in the Q-channel address block ADR in the subcode included in the TOC data shown in FIG. 3 or identification data for the third optical disc 2, recorded in the zero block ZERO and track number block TNO, the controller 96 will control the switch 89 to make a connection between the RF circuit 82 and third decoder 88, and control the feed motor 85 to move the optical pickup 81 to a position it will be able to read data recorded in the lead-in area in the second session 4 defined along the outer circumference so that data can preferentially be read from the second session 4 defined along the outer circumference.

The third optical disc player 80 constructed as above functions as will be described below. When a play start button provided on the operation unit 95 is pressed by the user, for example, the controller 96 will drive the drive motor 84 to rotate the loaded optical disc at a constant linear velocity while driving the feed motor 85 to move the optical pickup 81 to a position it will be able to read TOC data such as subcodes recorded in the lead-in area provided along the innermost circumference of the loaded optical disc. The optical pickup 81 detects a return light from the optical disc by a photodetector (not shown), converts it to electric signal and provides it to the RF circuit 82. The subcode extraction circuit 90 provides the extracted subcode to the controller 96. The controller 96 determines, based on the identification data in the control block CNT and zero block ZERO in the subcode, which the optical disc set on the disc table is, the first, second or third optical disc, or based on the identification data in the address block ADR, which the optical disc is, a multi-session type one or a single-session type one.

When no identification data for the optical disc is the second or third optical disc 6 or 2 can be detected in the subcode read from the lead-in area provided along the innermost circumference, the controller 96 determines that the first optical disc 5 is set on the disc table and controls the switch 89 to connect the RF circuit 82 and first decoder 86 to each other for playback of the first optical disc 5.

When the identification data for the second optical disc 6 is detected from the control block CNT in the subcode read from the lead-in area provided along the innermost circumference, the controller 96 will determine that the second optical disc 6 is set on the disc table and controls the switch 89 to make a connection between the RF circuit 82 and second decoder 87 for playback of the second optical disc 6.

Further, when the identification data for the third optical disc 2 is detected in the zero block ZERO and track number block TNO in the subcode read from the lead-in area provided along the innermost circumference, the controller 96 drives the feed motor 85 to move the optical pickup 81 to a position it will be able to read TOC data such as subcodes from the lead-in area in the second session 4 defined along the outer circumference of the third optical disc 2, and control the switch 89 to connect the RF circuit 82 and third decoder 88 to each other for playback of the third optical disc 2.

Moreover, when the identification data for the multi-session type optical disc is detected in the address block ADR in the subcode read from the lead-in area provided along the innermost circumference, the controller 96 will control the switch 89 to make a connection between the RF circuit 82 and second decoder 87 or third decoder 88, and drive the feed motor 85 to move the optical pickup 81 to a position where it will be able to read TOC data such as the subcodes from the lead-in area in the second session 4 defined along the outer circumference of the second optical disc 6 or third optical disc 2, whichever is set on the disc table in the optical disc 81. The third optical disc player 80 decodes the data read from the second session 4 by the second decoder 87 or third decoder 88 for playback of the second optical disc 6 or third optical disc 2 of the multi-session type.

When the user operates the operation unit 95 for reading the first session 3 along the inner circumference after reading the second session 4 defined along the outer circumference is complete, the controller 96 will control the switch 89 to make a connection between the RF circuit 82 and first decoder 86, and drive the feed motor 85 to move the optical pickup 81 to a position where it will be able to read TOC data such as subcodes from the lead-in area in the first session 3 along the inner circumference of the second or third optical disc 6 or 2. In the third optical disc player 80, the data read from the first session 3 is decoded by the first decoder 86 for playback of the second or third optical disc 6 or 2.

Figure 9C:
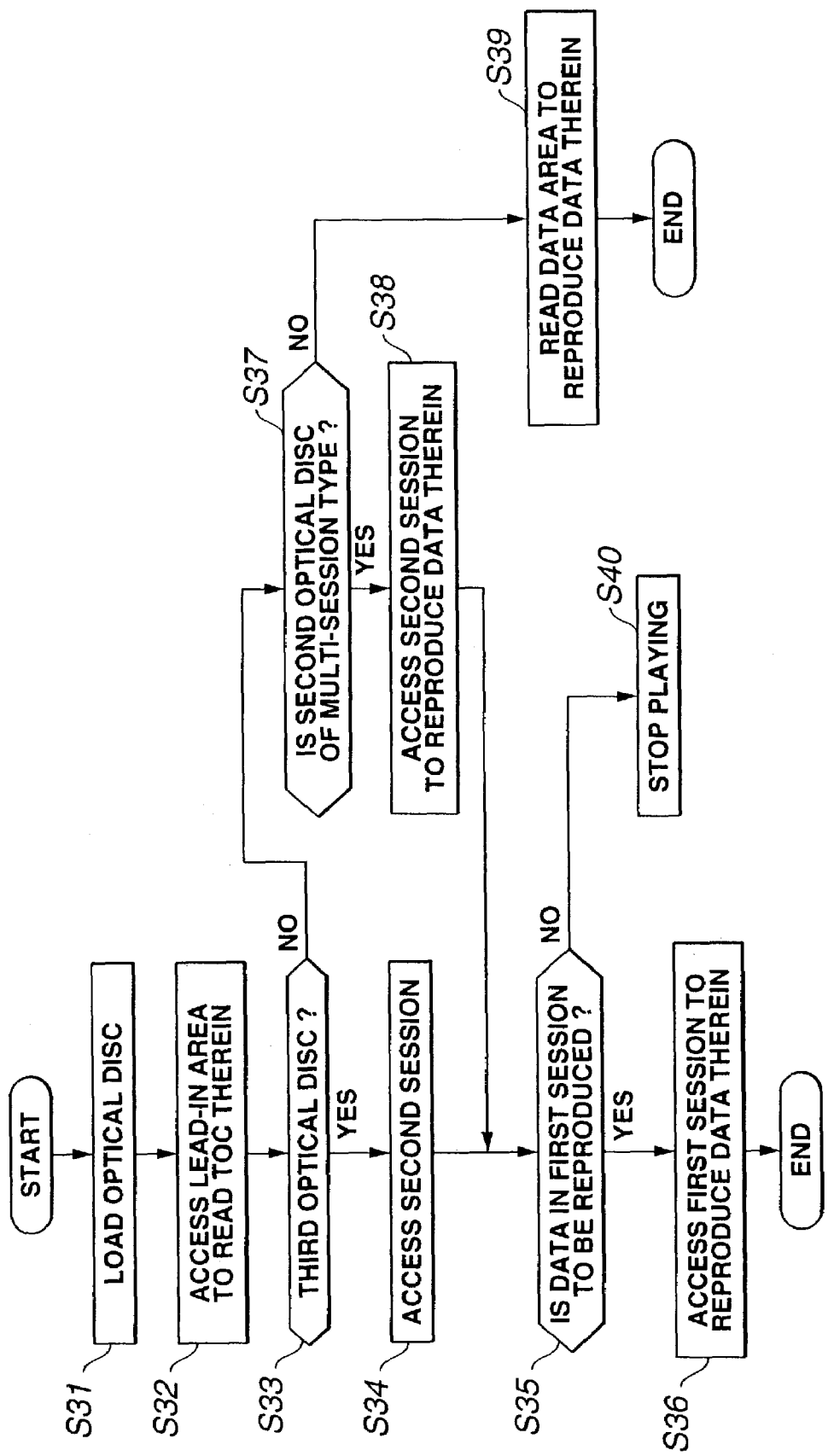
FIG. 9 explains how to control optical disc playback in the optical disc player according to the present invention, in which FIG. 9A explains how to control the optical disc playback in the first optical disc player, FIG. 9B explains how to control the optical disc playback in the second optical disc player and FIG. 9C explains how to control the optical disc playback in the third optical disc player.

Next, the optical disc playback system 1 including the first, second and third optical disc players 40, 60 and 80 having been described in the foregoing will be described herebelow with reference to FIGS. 9A to 9C.

First, the procedure for controlling the data reading in the first optical disc player 40 will be described with reference to FIG. 9A. In step S1, the user sets the first optical disc 5 on the disc table of the first optical disc player 40. Next in step S2, the user presses the play start button on the operation unit 52 for example, and the optical pickup 41 will be moved to the lead-in area provided along the innermost circumference of the first optical disc 5 and read data from the lead-in area. Thus, the subcode extraction circuit 48 extracts subcodes from the TOC data read by the optical pickup 41 from the lead-in area of the optical disc 5. Next in step S3, the optical disc 41 is moved radially of the first optical disc 5 based on the thus extracted subcode to read data from the first optical disc 5. The first data read from the first optical disc 5 is decoded by the first decoder 46 for reproduction of audio data recorded in the first optical disc 5.

Note that when the second optical disc 6 having computer program etc. recorded therein is loaded in the first optical disc player 40, the latter cannot decode the data by the first decoder 46 and so the second optical disc 6 will be ejected out of the first optical disc player 40. When a CD-Extra disc or the like is loaded in the first optical disc player 40, the latter will read only the first session 3 along the inner circumference since the first session 3 has recorded therein audio data which can be decoded by the first decoder 46.

Next, the procedure for controlling the data reading in the second optical disc player 60 will be described with reference to FIG. 9B. First in step S11, the user sets any of the first, second and third optical discs 5, 6 and 2 on the disc table in the second optical disc player 60. Next in step S12, when the play start button on the operation unit 74 is pressed by the user, the optical pickup 61 is moved to the lead-in area provided along the innermost circumference of the optical disc set on the disc table for reading TOC data recorded in the lead-in area. Thus, the subcode extraction circuit 69 extracts subcodes from the read TOC data.

In step S13, the controller 75 detects identification data for the multi-session type optical disc in the address block ADR of the Q subcode included in the TOC data shown in FIG. 3, and determines which the optical disc set on the disc table is, a single-session type one or multi-session type one. When the controller 75 determines, based on the detected identification data, that the optical disc set on the disc table is a multi-session type one, it goes to step S14. When the controller 75 determines, based on the detected identification data, that the optical disc is not any multi-session type one, that is, that the optical disc is a single-session type one, it goes to step S18 where it will provide such a control that TOC data is read from the lead-in area provided along the innermost circumference and the optical pickup 61 is moved radially of the optical disc based on the read TOC data for reading and reproducing the data from the optical disc.

In step S14, the controller 75 controls the feed motor 65 to move the optical pickup 61 to a position where it will be able to read TOC data recorded in the lead-in area in th second session 4 defined along the outer circumference so that data can preferentially read from the second session 4 defined along the outer circumference, and accesses the second session 4 defined along the outer circumference based on the TOC data read by the optical pickup 61 from the lead-in area in the second session 4.

In step S15, the controller 75 determines which of the first and second decoders 66 and 67 can decode the data read from the second session 4 defined along the outer circumference. That is, based on the identification data read from the control block CNT, included in the TOC data in the lead-in area of the second session 4 defined along the outer circumference, the controller 75 determines the type of the decoder which is capable of decoding the data read from the second session 4. The controller 75 controls the switch 68, based on the identification data in the control block CNT, to make a connection between the RF circuit 62 and the first decoder 66 or second decoder 67.

Controlling the switch 68 to make a connection between the RF circuit 62 and the first decoder 66 or second decoder 67, the controller 75 determines which of the first and second decoders 66 and 67 can decode the data read from the second session 4. When the first or second decoder 66 or 67 can read the data read from the second session 4, the controller 75 goes to step S16. On the other hand, when neither the first decoder 66 nor second decoder 67 can read the data from the second session 4, the controller 75 goes to step S19.

In step S16, the controller 75 selects either the first or second decoder 66 or 67 whichever can decode the data recorded in the second session 4, and controls the optical pickup 61 to start reading data from the second session 4 defined along the outer circumference. Thus the data recorded in the second session 4 is decoded by the first or second decoder 66 or 67 and provided to either the speaker 71 or monitor 72 depending upon the type of the decoded data.

In step S17, the controller 75 determines whether the operation unit 74 has been operated to read data from the first session 3 along the inner circumference. When the controller 75 has determined, based on the input from the operation unit 74, in step S17 that data is going to be read from the first session 3 along the inner circumference, it goes to step S18. On the other hand, when no command is entered from the operation unit 74 and the controller 75 has determined in step that data is not to be read from the first session 3 along the inner circumference, the controller 75 goes to step S20 where it will stop reading data from the loaded optical disc.

In step S18, the controller 75 controls the feed motor 65 to move the optical pickup 61 to a position where it will be opposite to the lead-in area of the first session 3 along the inner circumference of the second optical disc 6 so that it is possible to read data recorded in the lead-in area of the first session 3 along the inner circumference, namely, data recorded in the lead-in area provided along the innermost circumference. Thus, the optical pickup 61 will read TOC data such as subcodes from the lead-in area. The controller 75 determines, based on the identification data in the control block CNT in the subcode included in the TOC data in the lead-in area of the first session 3 along the inner circumference, the type of the decoder which can decode the data read from the first session 3, and controls the switch 68 to make a connection between the RF circuit 62 and the first decoder 66 or second decoder 67. In the second optical disc player 60, the data read from the first session 3 is decoded by the first decoder 66 or second decoder 67, and supplied via the I/F 73 to the monitor 72 on which a corresponding display is made, or via the D/A converter 70 to the speaker 71 which will provide a corresponding audio output.

When the controller 75 determines in step S15 that the data recorded in the second session 4 defined along the outer circumference cannot be decoded, it goes to step S19 where it will provide such a control as to eject the optical disc set on the disc table out of the second optical disc player 60. For example, when no data can be read from the second session 4 because the track pitch as in the second session 4 defined along the outer circumference of the third optical disc 2 is smaller than in the first optical disc 5 and second optical disc 6, the controller 75 provides a control to eject, from the second optical disc player 60, the third optical disc as an optical disc set on the disc table.

Note that when playing back the third optical disc 2, the controller 75 in the second optical disc player 60 will eject the disc 2 set on the disc table out of the apparatus 60 since data recorded in the third optical disc 2 cannot be read because the track pitch in the third optical disc 2 of the single-session type is smaller than in the first and second optical discs 5 and 6.

Next, the procedure for controlling the data reading in the third optical disc player 80 will be described with reference to FIG. 9C. First in step S31, the user sets any of the first, second and third optical discs 5, 6 and 2 on the disc table in the third optical disc player 80. Next in step S32, when the play start button on the operation unit 95 of the second optical disc player 80 is pressed by the user, the optical pickup 81 is moved to the lead-in area provided along the innermost circumference of the optical disc set on the disc table for reading TOC data from the lead-in area. Thus, the subcode extraction circuit 90 extracts subcodes from the read TOC data.

In step S33, the controller 96 determines, based on whether identification data for the third optical disc 2, recorded in the zero block ZERO and track number block TNO in the Q subcode shown in FIG. 3, has been detected, whether the optical disc set on the disc table is the third optical disc 2. When the identification data for the third optical disc 2 has been detected and the loaded optical disc has been determined to be the third optical disc 2, the controller 96 goes to step S34. On the other hand, when the identification data for the third optional disc 2 has not been detected and the loaded optical disc has been determined not to be the third optical disc 2, the controller 96 goes to step S37.

In step S34, the controller 96 controls the switch 89 to connect the RF circuit 82 and third decoder 88 to each other, and also the feed motor 85 to move the optical pickup 81 to a position where it will be able to read data recorded in the lead-in area of the second session 4 defined along the outer circumference so that data can preferentially read from the session defined along the outer circumference of the loaded optical disc. Thus, TOC data is read from the lead-in area, and data recorded in the second session 4 is read and reproduced based on the thus read TOC data.

In step S35, the controller 96 determines whether data is to be read from the first session 3 along the inner circumference based on the input from the operation unit 95. When the controller 96 has determined in step S35 that data is to be read from the first session 3 at the inner circumference based on the input from the operation unit 95, it goes to step S36. On the other hand, when there has been entered no command from the operation unit 95 and the controller 96 has determined in step S35 that no data is to be read from the first session 3, the controller 96 goes to step S40 where it will stop reading the loaded optical disc.

In step S36, for reading data recorded in the first session 3 along the inner circumference, the controller 96 controls the feed motor 85 to move the optical pickup 81 to the lead-in area of the first session 3 along the inner circumference of the second optical disc 6 for the optical pickup 81 to read subcodes from the TOC data recorded in the lead-in area of the first session 3. The controller 96 determines, based on the subcodes in the TOC data read from the lead-in area of the first session 3 along the inner circumference, the type of the decoder which can decode the data recorded in the first session 3, and controls the switch 89 to connect the RF circuit 82 to any of the first and second decoders 86 and 87. In the third optical disc player 80, the data read from the first session 3 is decoded by the first or second decoder 86 or 87, and supplied via the I/F 94 to the monitor 93 on which a corresponding display is made, or via the D/A converter 91 to the speaker 91 which provides a corresponding audio output, depending upon the type of the data.

If the controller 96 determines in step S33 that the optical disc set on the disc table is not any third optical disc 2, it will detect in step S37 identification data for the multi-session type optical disc, recorded in the address block ADR of Q subcode included in the TOC data shown in FIG. 3 to determine which the optical disc set on the disc table is, a single-session type one or a multi-session type one. When the controller 96 determines in step S37 that the optical disc set on the disc table is a multi-session type one, it goes to step S38. On the other hand, when it determines the loaded optical disc is not any multi-session type one, namely, that the optical disc is a single-session type, it goes to step S39.

In step S38, the controller 96 controls the feed motor 85 to move the optical pickup 81 to a position where it will be able to read data recorded in the lead-in area of the second session 4 defined along the outer circumference for reading TOC data recorded in the lead-in area of the second session 4. The controller 96 controls the optical pickup 81 to read subcodes in the TOC data in the lead-in area of the second session 4 defined along the outer circumference, whereby it will determine which of the first and second decoders 86 and 87 can decode the data read from the second session 4 defined along the outer circumference. The controller 96 controls the switch 89 to make a connection between the RF circuit 82 and the first decoder 86 or second decoder 87. After selecting a decoder which can decode data recorded in the second session 4 defined along the outer circumference, the controller 96 starts reading data recorded in the second session 4. The data read from the second session 4 is decoded by the first decoder 86 or second decoder 87, and supplied to the speaker 92 which will provide a corresponding audio output or to the monitor 93 which will provide a corresponding display, depending upon the type of the data.

When the controller 96 has determined in step S37 that the optical disc set on the disc table is not any multi-session type one, namely, that the optical disc is a single-session one, it goes to step S39 where it will start reproducing the data read from the loaded optical disc. More specifically, the controller 96 controls the optical pickup 81 to read subcodes in the TOC data from the lead-in area provided along the innermost circumference to determine, based on the subcode read from the optical disc, which can decode the data, the first decoder 86 or second decoder 87. Also, the controller 96 controls, based on the thus read subcode, the switch 89 to make a connection between the RF circuit 82 and the first decoder 86 or second decoder 87. Then, the controller 96 selects one of the first and second decoders 86 and 87, which is compatible with the data recorded in the first optical disc 5 or second optical disc 6, both of the single-session type, and controls the optical pickup 81 to start reproducing the data read from the optical disc 5 or 6. The data thus read is decoded by the first decoder 86 or second decoder 87, and supplied to the speaker 92 which will provide a corresponding audio output or to the monitor 93 which will provide a corresponding display, based on the type of the data.

Note that when the third optical disc 2 of the single-session type is set on the disc table, the controller 96 in the third optical disc player 80 detects identification data for the third optical disc 2 from the subcode recorded in the lead-in area provided along the innermost circumference and determines, based on the identification data, whether the loaded optical disc is the third optical disc 2, controls the switch 89 to make a connection between the RF circuit 82 and third decoder 88 and then the optical pickup 81 to reproduce the data read from the third optical disc 2.

Following the procedure for controlling the data reading in the aforementioned data playback system 1, the third optical disc 2 can be played back solely by the third optical disc player 80 which can be authenticated in the system 1 while the third optical disc 2 cannot be played back by the first and second optical disc players 40 and 60 which cannot be authenticated in the system 1. Therefore, even in case the second optical disc player 60 has a function to write information signals to a recordable optical disc such as CD-R or CD-RW, for example, data recorded in the second session 4 of the third optical disc 2 at a track pitch smaller than in the first and second optical discs 5 and 6 cannot be read, so that the third optical disc 2 will be ejected from the optical disc player. Thus, it is possible to prevent data from illegally being copied digitally to a recordable optical disc.

Figure 10:
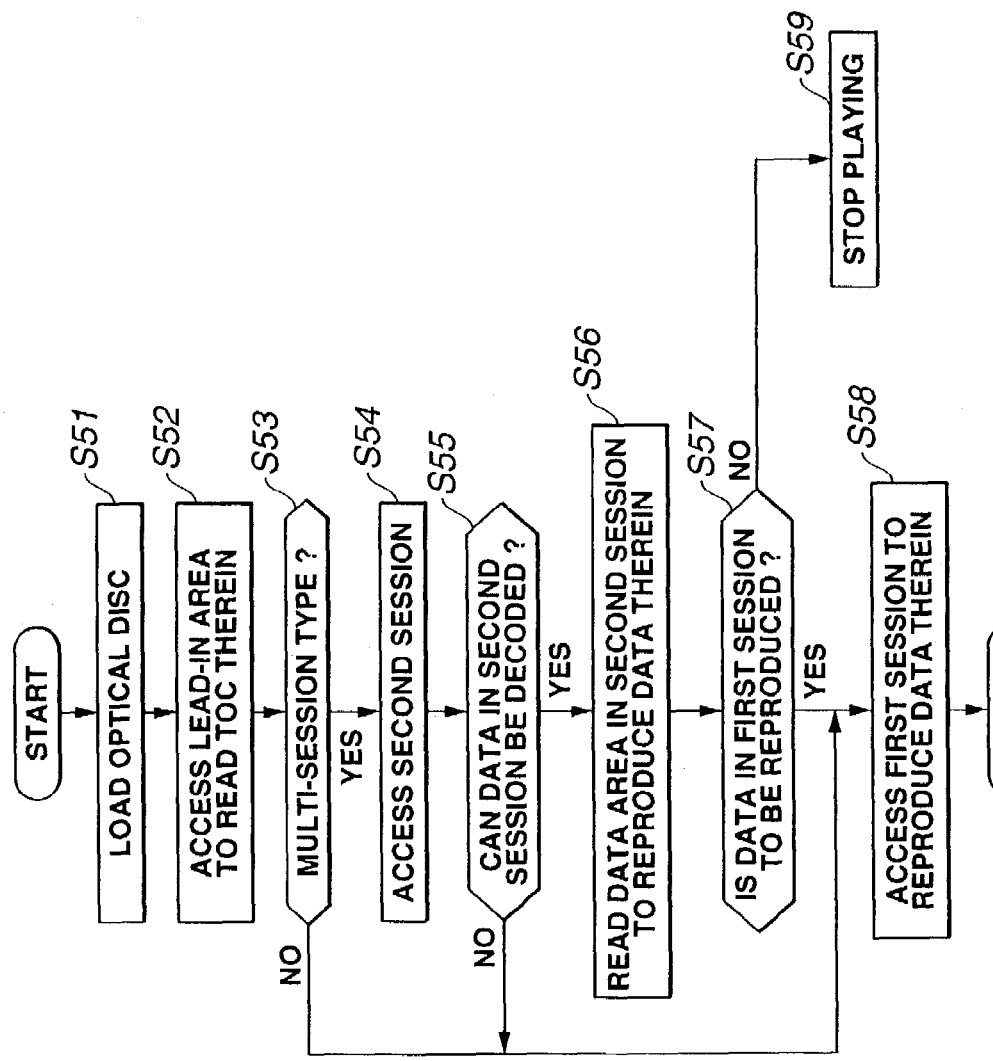
FIG. 10 shows a flow of operations made in a variant of the second optical disc player.

Next, another example of the procedure for controlling the data reading in the second optical disc player 60 will be described with reference to FIG. 10. In this second optical disc player 60, when data cannot be read from the second session 4, the loaded optical disc is not rejected but access is made to the second session 4 for reading data recorded there. Namely, this second optical disc player 60 is a circumvention device which positively prevents any optical disc player not authenticated for reading the third optical disc 2 from reading the third optical disc 2.

First in step S51, the user sets any of the first optical disc 5, second optical disc 6 or third optical disc 2 on the disc table of the second optical disc player 60. Next in step S52, when the user presses the play start button on the operation unit 74 for example, the optical pickup 61 in the second optical disc player 60 is moved to the lead-in area provided along the innermost circumference of the optical disc set on the disc table for reading TOC data recorded in the lead-in area. Thus, the subcode extraction circuit 69 extracts subcodes from the thus read TOC data.

In step S53, the controller 75 detects identification data for the multi-session type optical disc, recorded in the address block ADR of the Q subcode included in the TOC data as shown in FIG. 3 and determines which the optical disc set on the disc table is, a single-session type one or a multi-session type one. When the controller 75 has determined in step S53 that the optical disc set on the disc table is a multi-session type one, it goes to step S54. On the other hand, when the controller 75 has determined in step S53 that the optical disc is not any multi-session type one, namely, that the optical disc is a single-session type one, it goes to step S58 where it will control the optical pickup 61 to read TOC data from the lead-in area provided along the innermost circumference and play back the loaded optical disc based on the thus read TOC data.

In step S54, for preferentially reading data from the second session 4 defined along the outer circumference, the controller 75 controls the feed motor 65 to move the optical pickup 61 to a position where it will be able to read TOC data recorded in the lead-in area of the second session 4 defined along the outer circumference.

In step S55, the controller 75 determines, based on identification data recorded in the control block CNT, included in the subcode read from the lead-in area of the second session 4, which of the first and second decoders 66 and 67 can decoded the data read from the second session 4 defined along the outer circumference. Based on the thus read identification data, the controller 75 controls the switch 68 to make a connection between the RF circuit 62 and the first decoder 66 or second decoder 67.

Based on the thus read identification data, the controller 75 controls the switch 68 to determine which of the first and second decoders 66 and 67 can decode the data. When the first or second decoder 66 or 67 can decode the data read from the second session 4, the controller 75 goes to step S56. On the other hand, when the first or second decoder 66 or 67 cannot decode the data read from the second session 4, the controller 75 goes to step S58. That is, when data cannot be read from the second session 4 defined along the outer circumference of the third optical disc 2, the controller 75 of the second optical disc player 60 will not provide a control to eject the third optical disc 2 as a loaded optical disc out of the second optical disc player 60 but will control the feed motor 65 to move the optical pickup 61 to a position where it will be opposite to the second session 4 along the inner circumference of the third optical disc 2 for reading data recorded in the second session 4.

In step S56, the controller 75 selects, based on the identification data, a decoder which can decode the data recorded in the second session 4, and controls the optical pickup 61 to start reading data from the second session 4 defined along the outer circumference. The data recorded in the second session 4 is decoded by the first decoder 66 or second decoder 67, and supplied to the speaker 71 which will provide a corresponding audio output or to the monitor 72 which will provide a corresponding video output, depending upon the type of the data.

In step S57, the controller 75 determines, based on a command supplied from the operation unit 74 operated by the user, whether data is to be read from the second session 4 along the inner circumference. When the controller 75 has determined in step S57 based on the command from the operation unit 74 that data is to be read from the second session 4 along the inner circumference, it goes to step S58. On the other hand, when no command is supplied from the operation unit 74 and the controller 75 has determined in step S57 that data is not to be read from the second session 4, the controller 75 goes to step S59 where it will stop playing back the loaded optical disc.

In step S58, to read TOC data such as subcodes recorded in the lead-in area in the second session 4 along the inner circumference, namely, in the lead-in area provided along the innermost circumference, the controller 75 drives the feed motor 65 to move the optical pickup 61 to a position where it will be opposite to the lead-in area in the second session 4 along the inner circumference of the second optical disc 6. The controller 75 determines, based on the data such as subcodes in the TOC data read from the lead-in area of the second session 4 along the inner circumference, the type of the decoder capable of decoding data recorded in the first session 3, and controls the switch 68 to make a connection between the RF circuit 62 and the first decoder 66 or second decoder 67. In the second optical disc player 60, the thus read data is decoded by the first or second decoder 66 or 67, and supplied via the I/F 73 to the monitor 72 which will provide a corresponding display or via the D/A converter 70 to the speaker 71 which will provide a corresponding audio output.

In the second optical disc player 60, even if reading data from the third optical disc 2 is tried, it is not possible since the track pitch in the second session 4 is smaller than in the first and second optical discs 5 and 6, and the optical pickup 61 is forced to access the first session 3 along the inner circumference. Therefore, even when the second optical disc player 60 has a function to write information signals to a recordable optical disc such as CD-R or CD-RW for example, it is possible to prevent data recorded in the second session 4 of the third optical disc 2 from illegally being recorded digitally to such a recordable optical disc since data cannot be read from the second session 4.

Figure 11:
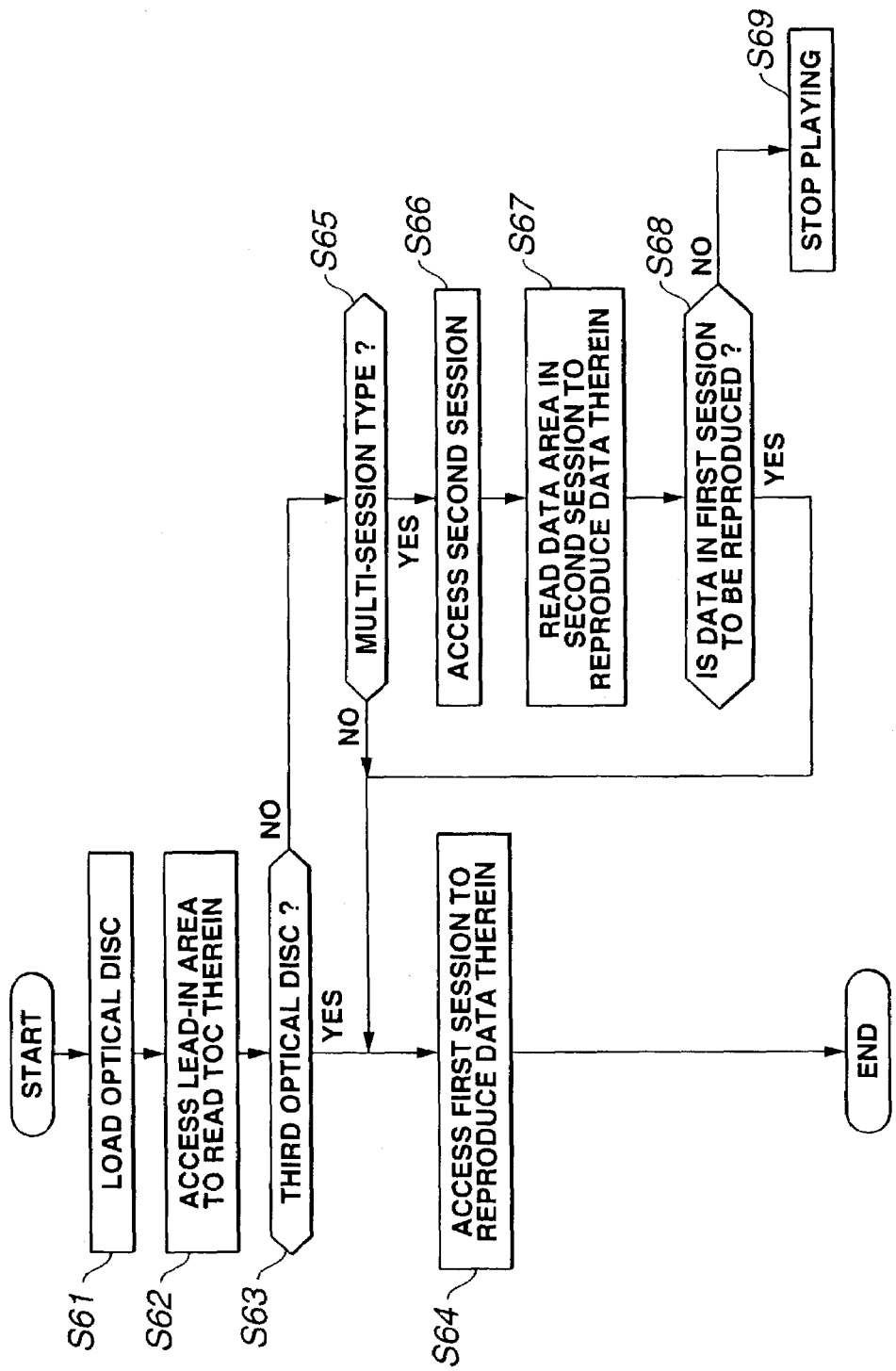
FIG. 11 shows a flow of operations made in a variant of the second optical disc player.

Also, a still another example of the procedure for controlling the data reading in the second optical disc player 60 will be described with reference to FIG. 11. In this second optical disc player 60, when the optical disc set on the disc table is detected to be the third optical disc 2, access is made to the first session 3 along the inner circumference but not o the second session 4.

First in step S61, the user sets any of the first optical disc 5, second optical disc 6 or third optical disc 2 on the disc table of the second optical disc player 60. Next in step S62, when the user presses the play start button on the operation unit 74 for example, the optical pickup 61 is moved to the lead-in area provided along the innermost circumference of the optical disc set on the disc table for reading TOC data recorded in the lead-in area. Thus, the subcode extraction circuit 69 extracts subcodes from the thus read TOC data.

In step S63, the controller 75 determines, depending upon whether there has been detected identification data for the third optical disc 2, recorded in the zero block ZERO and track number block TNO of the Q subcode as shown in FIG. 3, whether the optical disc set on the disc table is the third optical disc 2. When the controller 75 has determined based on the identification data detected in step S63 that the optical disc set on the disc table is the third optical disc 2, it goes to step S64. On the other hand, when the controller 75 has determined in step that the optical disc set on the disc table is not the third optical disc 2, it goes to step S65.

In step S64, the controller 75 drives the feed motor 65 to move the optical pickup 61 to a position where it will be opposite to the lead-in area of the first session 3 along the inner circumference and read TOC data such as subcodes recorded in the lead-in area of the second session 4 along the inner circumference of the optical disc. The controller 75 controls the optical pickup 61 to read identification data recorded, in the control block CNT in the subcode in the TOC data read from the lead-in area of the second session 4 along the inner circumference, determines type of the decoder capable of decoding the data recorded in the second session 4, and controls the switch 68, based on the identification data, to make a connection between the RF circuit 62 and the first decoder 66 or second decoder 67. In the second optical disc player 60, the data read from the first session 3 is decoded by the first decoder 66 or second decoder 67, and supplied via the I/F 73 to the monitor 72 which will provide a corresponding video output or via the D/A converter 70 to the speaker 71 which will provide a corresponding audio output.

When the controller 75 has determined in step S63 based on the identification data that the optical disc set on the disc table is not the third optical disc 2, it goes to step S65 where it will detect identification data for the multi-session type optical disc, recorded in the address block ADR of the Q subcode included in the TOC data as shown in FIG. 3, and determine which the optical disc set on the disc table is, a single-session type one or a multi-session type one. When the controller 75 has determined in step S65 that the optical disc set on the disc table is a multi-session type one, it goes to step S66. On the other hand, when the controller 75 has determined in step S65 that the loaded optical disc is not any multi-session type one, namely, that it is a single-session type one, it goes to step S64 where it will access the second session 4 defined along the outer circumference of the loaded optical disc.

In step S66, the controller 75 controls the feed motor 65 to move the optical pickup 61 to a position where it will be able to read data recorded in the lead-in area of the second session 4 defined along the outer circumference for access to that second session 4. In step S67, the controller 75 reads the control block CNT in the subcode in the lead-in area of the second session 4 defined along the outer circumference to select either the first decoder 66 or second decoder 67 and controls the switch 68 based on the read control block CNT. The controller 75 controls the optical pickup 61 to start reading data from the second session 4 defined along the outer circumference. The data read from the second session 4 is decoded by the first decoder 66 or second decoder 67, and supplied to the speaker 71 or monitor 72, depending upon the type of the data.

In step S68, the controller 75 determines, based on an operation signal entered from the operation unit 74, whether data is to be read from the first session 3 along the inner circumference. When the controller 75 has determined, based on the input from the operation unit 74, that data is to be read from the first session 3 defined along the inner circumference, it goes to step S64 where it will access the first session 3 and reproduce the data read from the first session 3. On the other hand, when no operation signal is entered from the operation unit 74 and it is determined in step S68 that data is not to be read from the first session 3, the controller goes to step S69 where it will stop reading the loaded optical disc.

In the aforementioned second optical disc player 60, when data is going to be read from the third optical disc 2, TOC data in the lead-in area provided along the innermost circumference is read and the loaded optical disc is detected to be the third optical disc 2, a forced access is made to the first session 3 without access to the second session 4. Therefore, even in case the second optical disc player 60 has a function to record information signals to a recordable optical disc such as CD-R or CD-RW, it is possible to prevent data recorded in the second session 4 of the third optical disc 2 from illegally being recorded digitally to such a recordable optical disc since no data can be read from the second session 4.

INDUSTRIAL APPLICABILITY

As having been described in the foregoing, the optical disc according to the present invention has data recorded in the first format in the first session along the inner circumference, data recorded in the second format in the second format in which the track pitch is smaller than in the first session along the inner circumference, and identification data for the multi-session type optical disc in the lead-in area in the first session along the inner circumference. Therefore, in a conventional optical disc player used for playing back this optical disc, the identification data for the multi-session type optical disc, recorded in the lead-in area, is detected and access is made to the second session defined along the outer circumference, from which no data can be read. With this optical disc, it is possible to prevent data in the second session defined along the outer circumference from being read by the second optical disc player.

Also, since the optical disc according to the present invention has recorded in the lead-in area identification data for the multi-session type optical disc, a optical disc player capable of reading data from the second session can preferentially read data from the second session.

In the optical disc player according to the present invention, when the second session cannot be read, the recording medium can be ejected or a forced access be made to the first session, whereby it is possible to prevent the data recorded in the second session from being reproduced by any unauthorized optical disc player, namely, to prevent such data from illegally being copied digitally, for example. Thus, the copyright for the data can be protected.

The invention claimed is:

1. An optical disc playback method comprising steps of reading medium identification data for an optical disc type from a first lead-in area of an optical disc loaded in an optical disc player;
reading data from a second recording area when it is determined based on the read medium identification data that the optical disc loaded in the optical disc player is a one in which a second lead-in area, second recording area provided along the outer circumference of the second lead-in area and a second lead-out area provided along the outer circumference of the second recording area are formed at a smaller track pitch than a first lead-out area provided along the inner circumference of the second lead-in area, first recording area provided along the inner circumference of the first lead-out area and the first lead-in area provided along the inner circumference of the first recording area; and
determining whether the data read from the second recording area can be decoded by at least one of a plurality of decoders by attempting to decode the data read from the second recording area on a trial basis using each of the plurality of decoders.

2. The method of claim 1 further comprising a step of ejecting the loaded optical disc from the optical disc player either when the data read from the second recording area cannot be decoded or when data recorded in the second recording area cannot be read.

3. The method of claim 1 further comprising a step of reading data from the first recording area when the data read from the second recording area cannot be decoded.

4. The method of claim 1, further comprising steps of:
reading data recorded in the second lead-in area before reading data from the second recording area; and
selecting one of the plurality of decoders based on the data read from the second lead-in area.

5. The method of claim 1, further comprising a step of reading data recorded in the first recording area when a command for reading the data recorded in the first recording area is entered after completion of reading the data recorded in the second recording area.

6. An optical disc playback method comprising steps of reading medium identification data for an optical disc type from a first lead-in area of an optical disc loaded in an optical disc player;
reading data from a first recording area when it is determined based on the read medium identification data that the optical disc loaded in the optical disc player is a one in which a second lead-in area, second recording area provided along the outer circumference of the second lead-in area and a second lead-out area provided along the outer circumference of the second recording area are formed at a smaller track pitch than first lead-out area provided along the inner circumference of the second lead-in area, first recording area provided along the inner circumference of the first lead-out area and the first lead-in area provided along the inner circumference of the first recording area; and determining whether the data read from the first recording area can be decoded by at least one of a plurality of decoders by attempting to decode the data read from the first recording area on a trial basis using each of the plurality of decoders.

7. The method of claim 6, further comprising a step of starting reading data from the second recording area of the loaded optical disc when it is determined that the loaded optical disc is a one having at least the first recording area, first lead-in area provided along the inner circumference of the first recording area, first lead-out area provided along the outer circumference of the first recording area, second lead-in area provided between the outer circumference of the first lead-out area and second recording area, and the second lead-out area provided along the outer circumference of the second recording area; and determining whether the data read from the second recording area can be decoded by at least one of a plurality of decoders by attempting to decode the data read from the second recording area on a trial basis using each of the plurality of decoders.

8. The method of claim 7, further comprising a step of reading data recorded in the first recording area when a command for reading the data recorded in the first recording area is entered after completion of reading the data recorded in the second recording area.

9. An optical disc player comprising:

a drive unit to rotate an optical disc loaded in the optical disc player;

an optical pickup to read data from the loaded optical disc;

an actuator to move the optical pickup radially of the loaded optical disc; and a controller to control the operation of at least the actuator while identifying the type of the loaded optical disc based on identification data read by the optical pickup from a first lead-in area of the loaded optical disc;

the controller controlling the actuator to move the optical pickup and causing the optical pickup to start reading data from a second recording area of the loaded optical disc when it is determined based on the identification data that the loaded optical disc is a one in which a second lead-in area, second recording area provided along the outer circumference of the second lead-in area and a second lead-out area provided along the outer circumference of the second recording area are formed at a smaller track pitch than a first lead-out area provided along the inner circumference of the second lead-out area, first recording area provided along the inner circumference of the first lead-out area and the first lead-in area provided along the inner circumference of the first recording area;

a plurality of decoders each configured to attempt to decode the data read from the second recording area on a trial basis; and the controller configured to determine whether the data read from the second recording area by each of the plurality of decoders can be decoded by at least one of the plurality of decoders.

10. The optical disc player of claim 9, wherein:

when the data read from the second recording area cannot be decoded by at least one of the plurality of decoders, the controller causes the loaded optical disc to be ejected from the apparatus.

11. The optical disc player of claim 9, wherein:

wherein when the data read from the second recording area cannot be decoded by at least one of the plurality of decoders, the controller controls the actuator to move the optical pickup for reading data from the first recording area of the optical disc.

12. The optical disc player of claim 9 wherein the controller provides a control for reading data recorded in the first recording area when a command for reading the data recorded in the first recording area is entered after completion of reading the data recorded in the second recording area.

13. The optical disc player of claim 9, wherein:

the controller controls the actuator to move the optical pickup to a position where it will be opposite to the second lead-in area to read data recorded in the second lead-in area and selects, based on the data read from the second lead-in area, one of the plurality of decoders that is to be supplied with output signals from the optical pickup.

14. The optical disc player of claim 9, wherein the controller provides a control for reading data recorded in a recording area based on the data read from a lead-in area when the loaded optical disc is determined to be a one having the lead-in area, recording area provided along the outer circumference of the lead-in area, and a lead-out area provided along the outer circumference of the recording area.

15. An optical disc player comprising:

a drive unit to rotate an optical disc loaded in the optical disc player;

an optical pickup to read data from the loaded optical disc;

an actuator to move the optical pickup radially of the loaded optical disc; and a controller to control the operation of at least the actuator while identifying the type of the loaded optical disc based on identification data read by the optical pickup from a first lead-in area of the loaded optical disc;

the controller controlling the actuator to move the optical pickup and causing the optical pickup to start reading data from a first recording area of the loaded optical disc when it is determined based on the identification data that the loaded optical disc is a one in which a second lead-in area, second recording area provided along the outer circumference of the second lead-in area and a second lead-out area provided along the outer circumference of the second recording area are formed at a smaller track pitch than in a first lead-out area provided along the inner circumference of the second lead-out area, first recording area provided along the inner circumference of the first lead-out area and the first lead-in area provided along the inner circumference of the first recording area;

a plurality of decoders each configured to attempt to decode the data read from the first recording area on a trial basis; and the controller configured to determine whether the data read from the first recording area by each of the plurality of decoders can be decoded by at least one of the plurality of decoders.

16. The optical disc player of claim 15, wherein the controller controls the actuator to the optical pickup and causes the pickup to start reading data from the second recording area of the loaded optical disc when it is determined that the loaded optical disc is a one having at least the first recording area, first lead-in area provided along the inner circumference of the first recording area, first lead-out area provided along the outer circumference of the first recording area, second lead-in area provided between the outer circumference of the first lead-out area and second recording area and second lead-out area provided along the outer circumference of the second recording area and the plurality of decoders are each configured to attempt to decode the data read from the second recording area on a trial basis and the controller is configured to determine whether the data read from the first recording area by each of the plurality of decoders can be decoded by at least one of the plurality of decoders.

17. The optical disc player of claim 15, wherein the controller provides a control for reading data recorded in the first recording area when a command for reading the data recorded in the first recording area is entered after completion of reading the data recorded in the second recording area.

18. The apparatus of claim 15, wherein the controller provides a control for reading data recorded in a recording area based on the data read from a lead-in area when the loaded optical disc is determined to be a one having the lead-in area, recording area provided along the outer circumference of the lead-in area, and a lead-out area provided along the outer circumference of the recording area.

\* \* \* \* \*